United States Patent [19]

Thome et al.

[11] Patent Number: 5,634,112

[45] Date of Patent: May 27, 1997

[54] MEMORY CONTROLLER HAVING PRECHARGE PREDICTION BASED ON PROCESSOR AND PCI BUS CYCLES

[75] Inventors: Gary W. Thome, Tomball; Michael P. Moriarty, Spring; John E. Larson, Katy, all of Tex.

[73] Assignee: Compaq Computer Corporation, Houston, Tex.

[21] Appl. No.: 324,112

[22] Filed: Oct. 14, 1994

[51] Int. Cl.$^6$ .................................................... G06F 12/06
[52] U.S. Cl. .......................... 395/481; 395/432; 365/238.5
[58] Field of Search ..................................... 395/431, 432, 395/481, 494, 405, 484; 365/235, 238.5

[56] References Cited

U.S. PATENT DOCUMENTS

| | | | |
|---|---|---|---|
| 4,933,910 | 6/1990 | Olson et al. | 365/238.5 |
| 5,218,681 | 6/1993 | Gephardt et al. | 395/281 |
| 5,253,214 | 10/1993 | Herrmann | 365/233 |
| 5,301,278 | 4/1994 | Bowater et al. | 395/405 |
| 5,303,364 | 4/1994 | Mayer et al. | 395/467 |
| 5,353,423 | 10/1994 | Hamid et al. | 395/470 |
| 5,469,558 | 11/1995 | Lieberman et al. | 395/285 |

OTHER PUBLICATIONS

Intel Corporation Cache and DRAM Controller (CDC)S82424TX, Revision 1., pp. 44–45.
Peripheral Components 1993 (INTEL), pp. 1–522; 1–567 to 1–570 (Oct. 1992).
Peripheral Component Interconnect (INTEL), 82420 PCIset Cache/Memory Subsystem (May 1993), pp. 23, 69–70.

*Primary Examiner*—Eddie P. Chan
*Assistant Examiner*—Kevin L. Ellis
*Attorney, Agent, or Firm*—Pravel, Hewitt, Kimball & Krieger

[57] ABSTRACT

A memory controller which provides a series of queues between the processor and the PCI bus and the memory system. Memory coherency is maintained in two different ways. Before any read operations are accepted from the PCI bus, both of the posting queues must be empty. A content addressable memory (CAM) is utilized as the PCI to memory queue. When the processor performs a read request, the CAM is checked to determine if one of the pending write operations in the PCI to memory queue is to the same address as the read operation of the processor. If so, the read operation is not executed until the PCI memory queue is cleared of the write. To resolve the problem of aborting a Memory Read Multiple operation, an abort signal from the PCI bus interface is received and as soon thereafter as can be done the read ahead cycle is terminated, even though the read ahead cycle has not fully completed. The memory controller has improved prediction rules based on whether the cycle is coming from the processor or is coming from the PCI bus to allow more efficient precharging when PCI bus cycles are used. The memory controller is highly programmable for multiple speeds and types of processors and several speeds of memory devices. The memory controller includes a plurality of registers that specify number of clock periods for the particular portions of a conventional DRAM cycle which are used to control state machine operations.

27 Claims, 14 Drawing Sheets

MEMORY CONTROLLER HAVING PRECHARGE PREDICTION BASED ON PROCESSOR AND PCI BUS CYCLES

BACKGROUND OF THE INVENTION

1. Field of the Invention

The invention relates to memory controllers utilized with computer systems, and more particularly to memory controllers which control DRAMs and have idle states between memory cycles.

2. Description of the Related Art

Computer systems are becoming ever more powerful by the day. Users are requiring more capabilities to run ever more complicated and sophisticated applications and computer system manufacturers are responding. Computer speeds have dramatically increased over the last number of years so that now desktop and file server computers can readily outperform mainframe computers of 10–15 years ago. But the quest for further performance is never ending. To this end, the microprocessor manufacturers have been developing ever faster microprocessors.

However, a computer system is far more than just a microprocessor. There are many other subsystems that must cooperate with the microprocessor to provide a complete computer system. It is desirable to optimize as many of these subsystems as possible and yet take into account cost and system flexibility to satisfy varied user desires.

Two of the subsystems which have not maintained pace with the development of microprocessor are the main memory systems and the input/output buses. Main memory system shortcomings have been much alleviated by the use of cache memory systems, but in the end all memory operations must ultimately come from the main memory, so that its performance is still a key piece in the overall performance of the computer system. Many advanced memory architectures and techniques have developed over the years. One of the most common techniques is the use of paged mode memory devices or DRAMS, where the actual memory address location value is divided into rows and columns, and if the row address, i.e., the page, is the same for the subsequent operation, only column addresses need to be provided to the DRAM. Although there is a certain amount of overhead required, it easily pays for itself by the improved performance gained during a page hit. So basic page mode operation provides a major performance increase, but more performance is always desired.

One further performance increase relates to an improvement for determining the level of the row address strobe or RAS* signal when the memory system is idle. As is well known, the RAS* signal must be negated or set high to allow a new page or row address to be provided and there is also a precharge time requirement. Thus, there is a performance penalty if the RAS* signal is raised when the next operation is actually a page hit. Similarly, there is a delay if the RAS* signal is kept low and the operation is a page miss, as the full precharge time must also be expended after the cycle has been issued. To address this concern, various techniques have been developed to predict whether the RAS* signal should be kept low or should be returned high to indicate a new page cycle. The prediction can be done several ways, as indicated in Ser. No. 08/034,104 filed Mar. 22, 1993, entitled Memory Controller That Dynamically Predicts Page Misses. In that application several techniques are used. A first, simple technique bases the prediction on the type of the last cycle performed by the processor, with the choice always fixed. A second, more sophisticated technique samples the hits and misses for each cycle type and then sets the RAS* level based on this adaptive measurement. But the techniques have been based on the use of the processor cycles and have not based themselves on the I/O bus cycles. Therefore, I/O bus master operations still performed at lesser levels.

One high performance I/O bus is the PCI or Peripheral Component Interconnect bus developed by Intel Corp. and accepted by many computer manufacturers. PCI is a high performance bus and allows numerous bus masters to be present. The bus masters are essentially local processors which perform specific duties, not general processing duties. By having these bus masters, the main processor is able to off load various specialized processing tasks, so that more tasks can be performed in parallel, thereby increasing the performance of the computer system. This is but one example of how parallelism is being used in current computer systems.

It is desirable to have as many operations running in parallel or concurrently as possible to allow increased overall performance. One way this concurrent operation has been done in the past is by the use of write posting, where a single cycle from the processor is latched into a posting buffer and ready is returned to the processor prior to the write cycle actually being completed to the memory or I/O device. The entire data and address values are posted in a latch and then the cycle executed on the target bus when possible. However, write posting has been kept at a very simple level, such as one level per bus, because of complications in memory coherency and cycle ordering which result if deeper posting were to be performed. Therefore, it can be seen that there are numerous gains that could be obtained if one were able to write post more than a single operation to a given bus, if the complications could be simply solved.

The PCI bus provides opportunities to increase overall system performance, particularly that of the memory system. One of the read operations defined for the PCI bus is what is termed as a Memory Read Multiple cycle, which is used to indicate a desire to read a number of cache or memory lines, not just a single line. As noted in the PCI bus cycle definition, this cycle decoding provides an opportunity for the memory controller to start doing read aheads or pipelining so that the data can be obtained prior to actually being required on the PCI bus. With this data then obtained, the memory controller can allow access by the processor, thus further increasing overall system concurrency. However, it is also common for PCI bus masters to abort cycles prior to their completion, and if such an aborted cycle were to occur shortly after a Memory Read Multiple cycle has commenced, then a read ahead operation would have been started and would conventionally complete, only to have the data then immediately discarded. This would reduce overall system performance because of the wasted operations needed to start and complete the full read ahead operation. Therefore, it would be desirable to reduce the wasted time when doing read aheads during Memory Read Multiple cycles when the cycle is aborted early by the bus master on the PCI bus.

Further, personal computer systems are becoming mass market products, and therefore need to be very flexible to meet the widely varying particular goals of users. For example, some users may desire the ultimate in performance with little regard for cost, whereas other users may be significantly more cost sensitive. One area where cost directly impacts performance is in the speed of the memory devices used in the main memory. Another area of impact is the economies of scale which could be obtained by using a single memory controller chip for many different microprocessor configurations and speeds. But using a single memory controller usually involves performance tradeoffs. The memory controller as disclosed in U.S. Pat. No. 5,333,293 addressed the multiple speed processor point, but could use only a single speed of memory devices, thus limiting user options and performance tradeoffs. In another memory controller as disclosed in Ser. No. 08/034,290 filed Mar. 22, 1993, the memory controller can handle different speed memory devices on a bank-by-bank or module-by-module basis, and yet allows optimal timing for each particular memory device. However, this memory controller was designed to be used with a single processor operating at a single speed, thus providing user flexibility but not economy of scale. It would be more desirable to allow numerous types and speeds of processors to be utilized with a single memory controller, and yet allow use of numerous types and speeds of memory devices without requiring great complexity.

SUMMARY OF THE INVENTION

A computer system according to the present invention has a memory controller that provides numerous performance increases, particularly in the PCI bus environment, and can readily work with numerous types and speeds of processors and different speed memory devices.

To further improve the system, the memory controller of the preferred embodiment has improved prediction rules for determining when to precharge the DRAM devices. The prediction rules are based on whether the cycle is coming from the processor or is coming from the PCI bus. By using these new rules, more efficient precharging is done, and additionally, more page mode cycles can be performed than otherwise would have been done according to the prior art.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

The following disclosures are hereby incorporated by reference:

U.S. application Ser. No. 08/324,016, entitled Single Bank, Multiple Way Cache Memory, by Sompong O. Olarig, Jens K. Ramsey, and Michael J. Collins, filed Oct. 14, 1994;

U.S. application Ser. No. 08/324,246, entitled Memory Controller With Write Posting Queues for Processor and I/O Bus Operations and Ordering Logic for Controlling the Queues, by Michael J. Collins, Gary W. Thome, Michael Moriarty, Jens K. Ramsey, and John E. Larson, filed Oct. 14, 1994;

U.S. application Ser. No. 08/323,263, entitled Data Error Detection and Correction System, by William J. Walker and Alan L. Goodrum, filed Oct. 14, 1994;

U.S. application Ser. No. 08/324,020, entitled Circuit for Invalidating Portions of a Cache Memory if a Write Occurs to a Write Protected Area of Main Memory by Jens K. Ramsey, filed Oct. 14, 1994;

U.S. application Ser. No. 08/323,110, entitled Circuit for Placing a Cache Memory Into Low Power Mode in Response to Special Bus Cycles, by Jens K. Ramsey, and Jeffrey C. Stevens, filed Oct. 14, 1994; and U.S. application Ser. No. 08/323,011, entitled System for Arbitrating Access to Memory by John E. Larson, Michael Moriarty, Michael J. Collins and Gary W. Thome, filed Oct. 14, 1994; all of which are assigned to the assignee of this invention.

Figure 1:
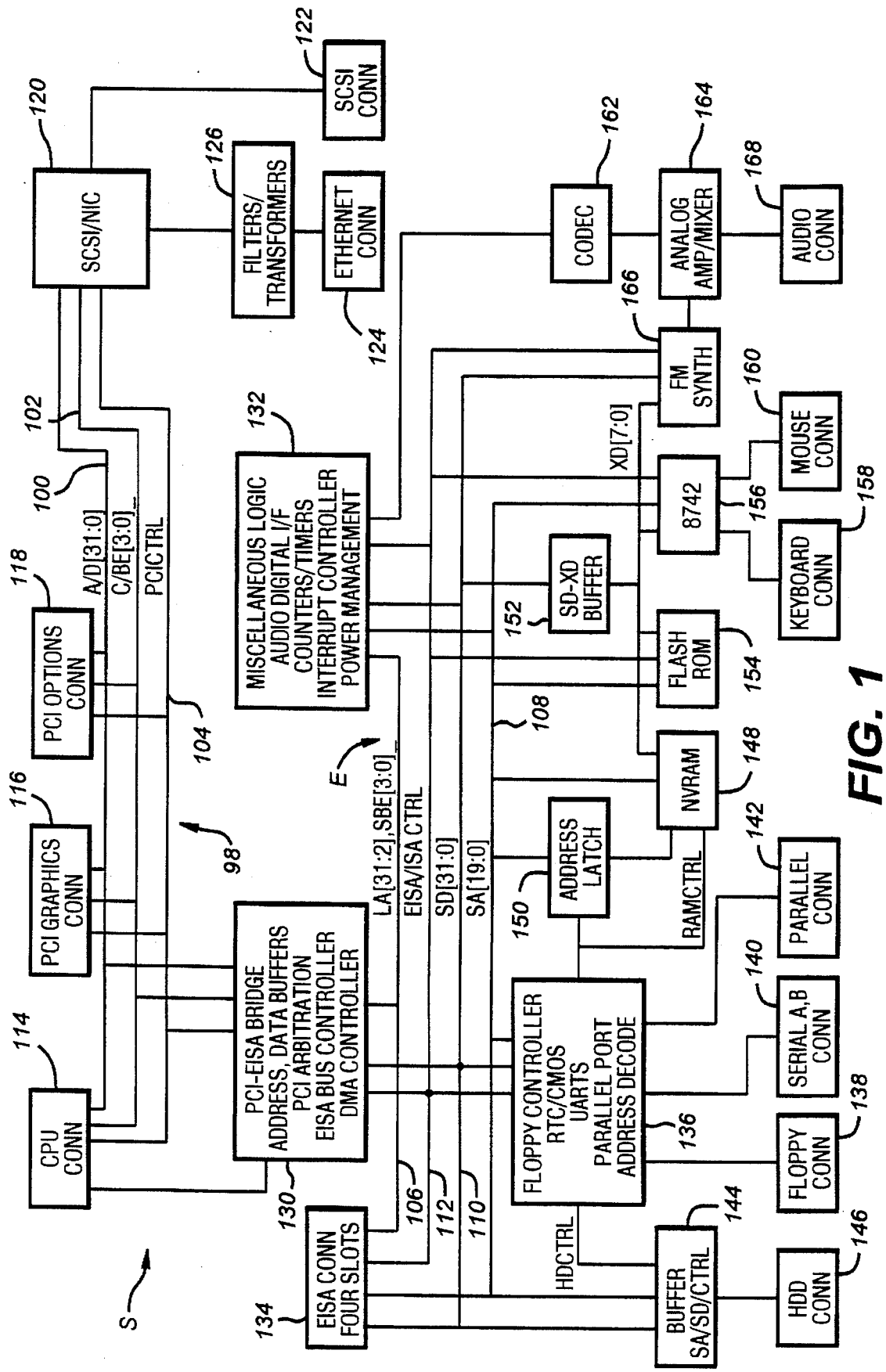
FIG. 1 is a block diagram of a system board of a computer system according to the preferred embodiment.

Referring now to FIG. 1, the system board S of a computer system according to the present invention is shown. In the preferred embodiment, the system boards contain circuitry and slots for receiving interchangeable circuit boards. In the preferred embodiment, there are two primary buses located on the system board S. The first bus is the PCI or Peripheral Component Interconnect bus 98 which includes address/data portion 100, control and byte enable portion 102 and control signal portion 104. The second primary bus on the system board S is the EISA bus E. The EISA bus E includes LA address portion 106, SA address portion 108, SD data portion 110 and EISA/ISA control signal portion 112. The PCI and EISA buses P and E form the backbones of the system board S.

Figure 2:
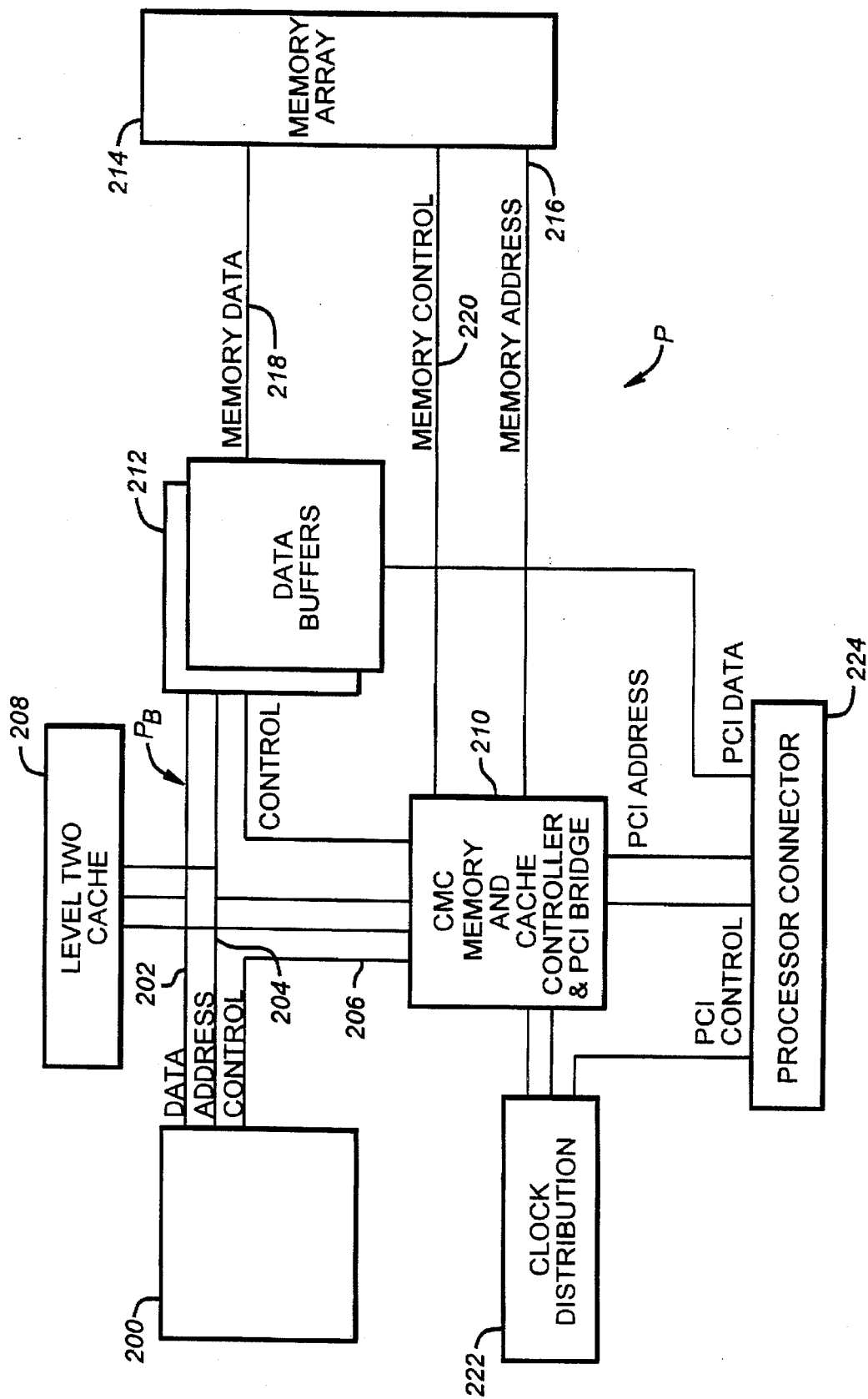
FIG. 2 is a block diagram of a processor board according to the present invention for use with the computer system of FIG. 1.
Figure 3:
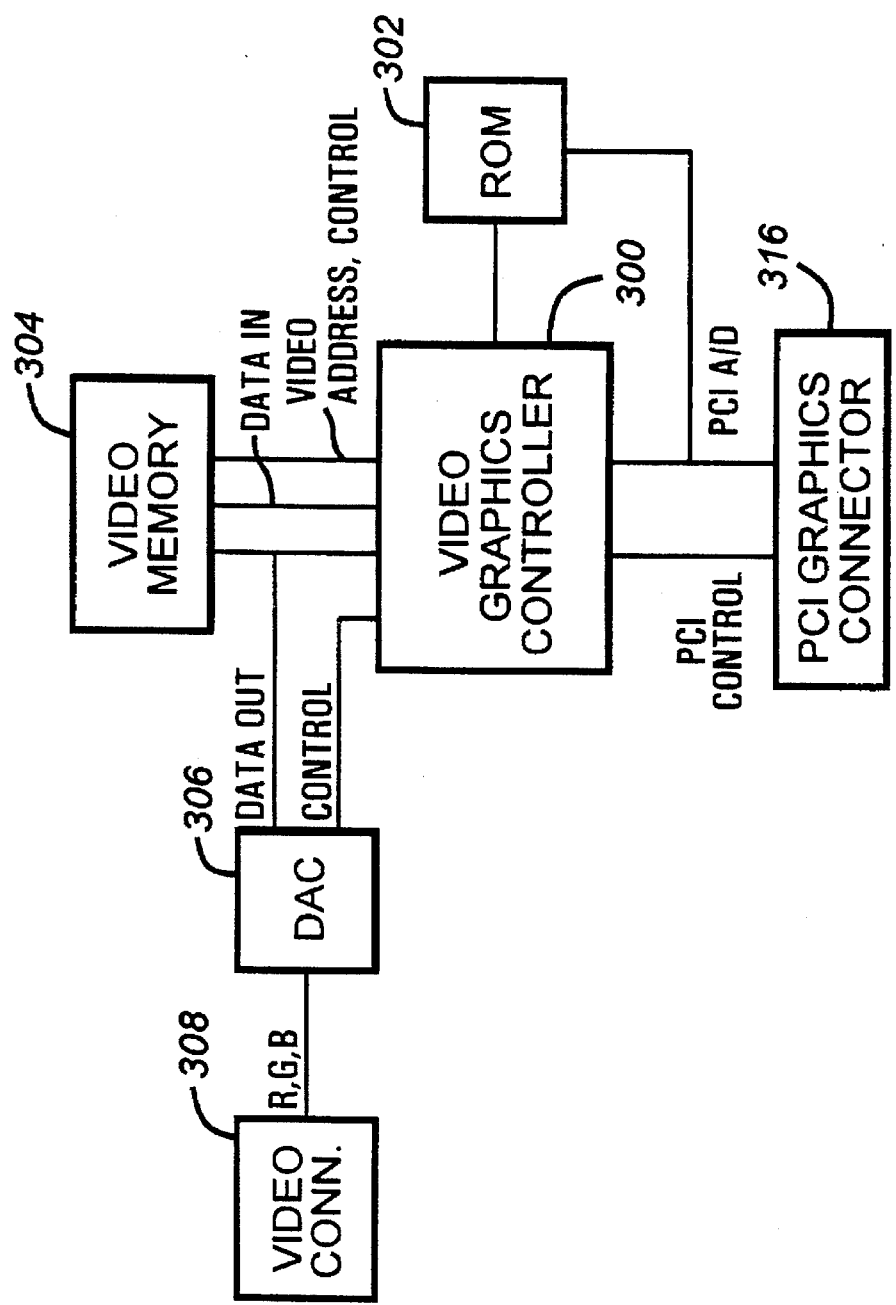
FIG. 3 is a block diagram of a video system for use with the computer system of FIG. 1.

A CPU connector 114 is connected to the PCI bus 98 to receive interchangeable processor cards, such as the one shown in FIG. 2. A PCI graphics connector 116 is connected to the PCI bus 98 to receive a video graphics card as shown in FIG. 3. A PCI option connector 118 is also connected to the PCI bus 98 to receive any additional cards designed according to the PCI standard. In addition, a SCSI and network interface (NIC) controller 120 is connected to the PCI bus 98. Preferably the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system boards and computer to a local area network A PCI-EISA bridge 130 is provided to convert signals between the PCI bus 98 and the EISA bus E. The PCI-EISA bridge 130 includes the necessary address and data buffers and latches, arbitration and bus master control logic for the PCI bus, EISA arbitration circuitry, and EISA bus controller as conventionally used in EISA systems and a DMA controller. Preferably the PCI-EISA bridge 130 is a single integrated circuit, but other combinations are possible. A miscellaneous system logic chip 132 is connected to the EISA bus E. The miscellaneous system logic chip 132 contains a digital audio interface, counters and timers as conventionally present in personal computer systems, an interrupt controller for both the PCI and EISA buses P and E and power management logic, as well as other miscellaneous circuitry. A series of four EISA slots 134 are connected to the EISA bus E to receive ISA and EISA adapter cards. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus E and the combination I/O chip 136 to act as a buffer between the EISA bus E and a hard disk drive connector 146 to allow connection of an IDE-type hard disk drive. A non-volatile random access memory (NVRAM) 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information. A data buffer 152 is connected to the SD portion of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus E and is controlled by the miscellaneous system logic chip 132. An audio connector 168 is provided to allow external audio connections to the computer and is connected to the outputs and inputs of the analog amplifier and mixer 164.

Referring now to FIG. 2, the processor board P is shown. In the processor board P of FIG. 2, the CPU or processor 200 can be any of a plurality of processors, such as the 486DX/33, 486DX2/66, 486DX4/50-100, 486DX4/33-100, 486DX4/33-83, P24T, Pentium 50/75, Pentium 60/90, and Pentium 66/100, and other similar and compatible processors. The processor 200 provides data, address and control portions 202, 204 and 206 to form a processor bus PB. A level 2 (L2) or external cache memory system 208 is connected to the processor bus PB to provide additional caching capabilities to improve performance of the computer system. The L2 cache 208 can be organized as a 128 kbyte direct mapped cache or 256 kbyte two-way set associative cache when used with 486 family processor and as a 256 or 512 kbyte direct mapped or two-way set associative cache when used with Pentium family processors. A cache and memory controller (CMC) and PCI bridge chip 210, is connected to the control portion 206 and to the address portion 204. The CMC 210 is connected to the L2 cache 208 as it incorporates the cache controller and therefore controls the operations of the cache memory devices in the L2 cache 208. The CMC 210 is also connected to control a series of address and data buffers 212. The data buffers 212 are utilized to handle memory data to a main memory array 214. The data buffers 212 are connected to the processor data portion 202 and receive control signals from the CMC 210. The data buffers 212 provide a memory address bus 216 and a memory data bus 218 to the memory array 214. A memory control signal bus 220 and memory address bus 216 is provided from the CMC 210. Clock distribution and generation circuitry 222 is associated with the processor card P and is connected to the CMC 210. A processor connector 224, such as a card edge, is provided to be mateably received by the processor connector 114. The processor connector 224 is connected to the CMC 210, the data buffers 212 and the clock distribution circuitry 222 to provide clocks to the computer system and to provide a PCI interface to allow the processor 200 to access the PCI and EISA buses P and E and to allow PCI and EISA bus masters to access the main memory array 214.

Referring now to FIG. 3, an exemplary video graphics adapter is shown. A video graphics controller 300 is connected to a PCI graphics connector 316, which is mateably received in the graphics connector 116. A ROM 302 is connected to the graphics connector 316 and receives control signals from the video graphics controller 300. Video memory 304 is used to store the graphics data and is connected to the video graphics controller 300 and a digital/analog converter (DAC) 306. The video graphics controller 300 controls the operation of the video memory 304, allowing data to be written and retrieved as required. A video connector 308 is connected to the DAC 306. A monitor (not shown) is connected to the video connector 308.

It is noted that the above description of a computer system is provided for completeness and numerous variations could be developed as apparent to those skilled in the art.

Figure 4:
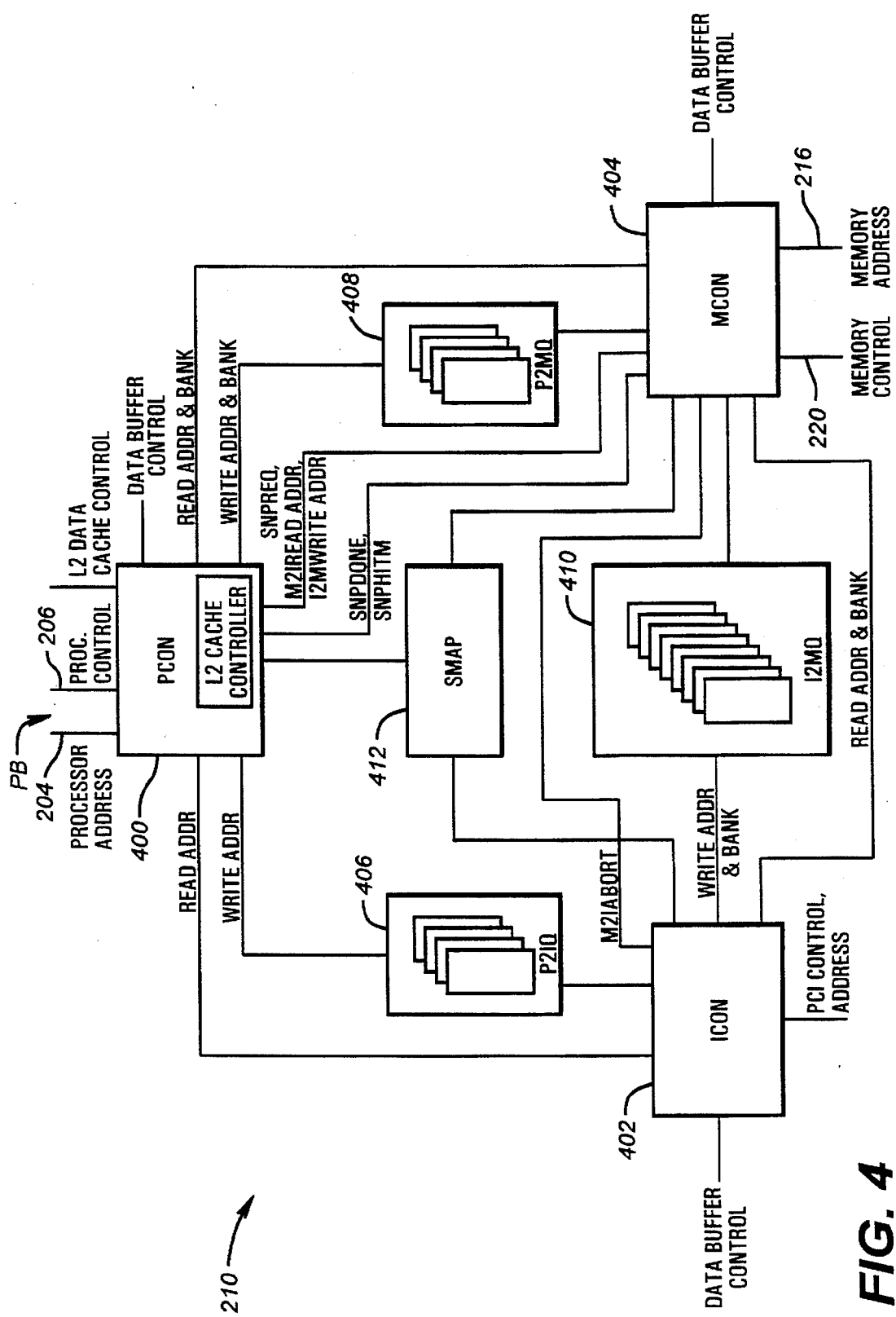
FIG. 4 is a block diagram of the memory controller of the processor board of FIG. 2.

Referring now to FIG. 4, a block diagram of the memory controller 210 is shown. There are three main control blocks in the memory controller 210 and three primary address transfer queues. The three primary control blocks are the processor control or PCON block 400, the PCI control or ICON block 402, and the memory control or MCON block 404. The PCON block 400 provides the interface to the processor bus PB, particularly the processor address bus 204 and the processor control bus 206. Additionally, the PCON block 400 is connected to the L2 data cache 208 and provides the necessary control signals. The L2 cache controller is contained in the PCON block 400. In addition, the PCON 400 provides signals to control the data buffers 212. The ICON block 402 provides data buffer control signals to the data buffer 212 and in addition interfaces to the PCI bus 98, particularly, the control and address portions. The MCON block 404 is the memory device control portion and is connected to the memory address bus 216 and the memory control bus 220, and additionally provides signals to control the data buffers 212. Each of the particular control blocks 400, 402 and 404 control different portions of the data buffers 212 as will be illustrated.

The memory controller 210 and data buffer 212 are effectively organized as a triangle or delta so that data transfer can occur between the processor bus PB and the PCI bus 98, between the processor bus PB and the memory bus, and between the PCI bus 98 and the memory bus. To this end the PCON block 400 is connected directly to the ICON block 402 to provide read addresses for read operations by the processor 200 to the PCI bus 98. The write addresses are provided from the PCON 400 to a P2I queue 406. Preferably, the P2I queue is four operations deep, so that four write operations can be posted to the queue and thus be pending at one time. It is noted that in the case of a 64 bit Pentium microprocessor 200, this would translate to 8, 32 bit PCI bus 98 operations. The output of the P2I queue 406 is provided to the ICON block 402 to provide an address stream. In similar fashion, the read address information and address bank information is provided from the PCON block 400 to the MCON block 404 for processor reads from the main memory 214. The write addresses and bank information are provided from the PCON block 400 to a P2M queue 408, which is again also preferably four quadword addresses deep, so that four write operations from the processor 200 can be posted to the memory array 214 if a Pentium processor and eight operations if a 486-based processor. The output of the P2M queue 408 is provided to the MCON block 404.

The ICON block 402 is connected to the MCON block 404 to provide read addresses and memory bank information for read operations from the PCI bus 98 to the memory 214. In addition, the write address information and bank information is provided from the ICON block 402 to an I2M queue 410. Preferably, the I2M queue 410 is capable of posting eight quadword addresses to provide relatively deep posting from the PCI bus 98 to the memory 214. The output of the I2M queue 410 is connected to the MCON block 404. An SMAP or system map block 412 is connected to the control block 400, 402 and 404 to provide various signals as necessary.

In addition, a signal referred to as M2IABORT is provided from the ICON block 402 to the MCON block 404 to allow the MCON block 404 to determine when a Memory Read Multiple operation has been aborted by the PCI bus master, as well as for other PCI abort operations. For this discussion, only the Memory Read Multiple case is of interest and the other cases will not be discussed. The MCON block 404 provides a snoop request or SNPREQ signal, the M2I read address that is the address for memory to PCI read operations and the I2M write address to the PCON block 400. This allows the PCON block 400 to perform snoop operations with the L2 cache controller and to provide the operation to the processor 200 so that the L1 cache controller inside the processor 200 can also perform a snoop operation. Snooping of read addresses as well as write addresses is necessary because the L2 cache controller, and the L1 cache controller in the processor 200 in certain cases, are preferably organized as writeback cache controllers, and therefore, snoop operations must occur on reads to maintain memory coherency. The PCON block 400 provides the SNPDONE and SNPHITM or snoop done and snoop hit to modified signals to the MCON block 404 to allow the MCON block 404 to proceed with the read or write operations or retry a read operation if appropriate.

Figure 5:
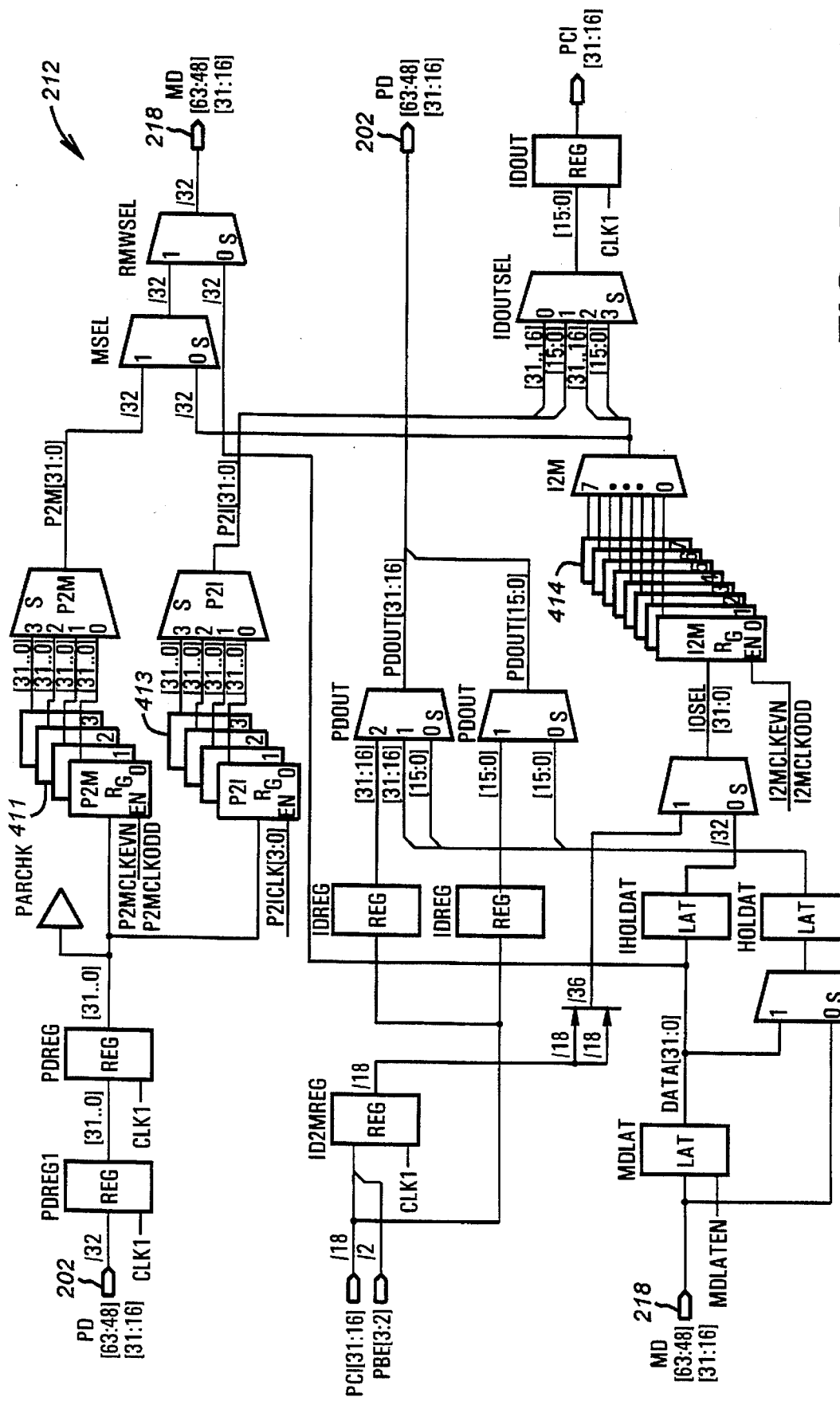
FIG. 5 is a block diagram of the data buffer of FIG. 2.

Referring now to FIG. 5, more details of the data buffers 212 are shown. It can be noted that the data buffers 212 also contain queues 411, 413 and 414 similar to those in the memory controller 210 so that addresses are tracked in the memory controller 210 while the data is maintained and transferred through the data buffers 212. The memory controller 210 is organized to control the data buffers 212 such that the particular control blocks 400, 402 and 404 control their respective portions of the data buffers 212. For example, the PCON block 400 controls the latching of data from the processor data bus into the various registers and the output enable or driving of the data from the memory onto the processor data bus 202. Similarly, the ICON block 402 handles latching of data into the various registers from the PCI bus 98 and the output enables of the data to the PCI bus 98. The MCON block 404 handles the operation of shifting data through the various queues 411, 413 and 414, driving data from the queues 411, 413, 414 to the actual memory devices and latching data as required from the memory devices into either the I2M queue 414 or to registers as provided to the processor data bus 202 and the PCI bus 98. It is noted that the processor to memory and processor to PCI queues 411 and 413 are unidirectional in the data buffers 212 but the PCI to memory queue 414 is operated bidirectionally, that it is used for both write data and the read ahead data. Operation will be clearer according to the description below.

One of the features of the memory controller 210 of the preferred embodiment is that it allows great flexibility in the use of various speed microprocessors and various speed DRAM devices in the memory array 214. Indeed, it allows the memory devices to vary from bank to bank, the main memory array 214 preferably being formed of eight banks or modules. The memory controller 210 of the preferred embodiment allows three different memory speeds to be utilized, with each bank being designated as one of the particular speeds. Each particular memory speed then has a series of parameters relating to timing values as commonly utilized in DRAM specifications. For each particular memory speed, a value to indicate the row address hold time from RAS* is provided, the column address set up times to the CAS* strobe for both reads and writes are provided, the row address set up time to the RAS* signal is provided, as is the memory data set up time to the CAS* strobe and the pulse width of the CAS* strobe. In addition, the RAS precharge time is provided for each memory speed. An indication of when the cycle ready signal is provided to the processor 200 or PCI bus 98 is also indicated as a timing parameter. Preferably, these timing parameters utilize 10 bits of memory in a 16 bit register, the organization shown in Table 1.

TABLE I

Memory Timing Control Register
Bit 15      Reserved
Bits[14:13]     RAS precharge
                00 = 2 clocks
                01 = 3 clocks
                10 = 4 clocks
                11 = 5 clocks
Bits[12:11]     MRDY read state
                00 = Assert MRDY in the C1 state
                01 = Assert MRDY in the C2 state
                10 = Assert MRDY in the C3 state
                11 = reserved

TABLE I-continued

| Bits[10:9] | reserved |
|---|---|
| Bit 8 | CAS pulsewidth |
| | 0 = 2 clocks |
| | 1 = 3 clocks |
| Bits[7:5] | Reserved |
| Bit 4 | MD setup to CAS |
| | 0 = 1 clock setup time |
| | 1 = 2 clocks setup time |
| Bit 3 | Row Address Setup to RAS |
| | 0 = 1 clock setup time |
| | 1 = 2 clocks setup time |
| Bit 2 | Column Address Setup to CAS, writes |
| | 0 = 1 clocks setup time |
| | 1 = 2 clocks setup time |
| Bit 1 | Column Address Setup to CAS, reads |
| | 0 = 1 clocks setup time |
| | 1 = 2 clocks setup time |
| Bit 0 | Row Address Hold from RAS |
| | 0 = 1 clock hold time |
| | 1 = 2 clocks hold time |

RAS Precharge defines the number of clocks in which all RAS* signals must be negated (high) before any are allowed to be asserted (low) again.

MRDY read state defines which CAS state MRDY should be asserted for a memory data read. If the CAS pulsewidth is two clocks wide, C2 is skipped. The MRDY state varies on clock frequency and memory speed.

CAS pulsewidth defines how many clocks CAS* signals must be held asserted.

MD Setup Time to CAS defines how many clocks the MD bus must be driven from the data buffers 212 before CAS* is asserted for a write.

Column Address Setup to CAS, writes defines the number of clocks after the Column Address is generated before CAS* can be asserted for a write cycle.

Column Address Setup to CAS, reads defines the number of clocks after the Column Address is generated before CAS* can be asserted for a read cycle.

Row Address Hold from RAS defines the number of clocks after RAS* asserts before the Row Address may change.

Figure 6:
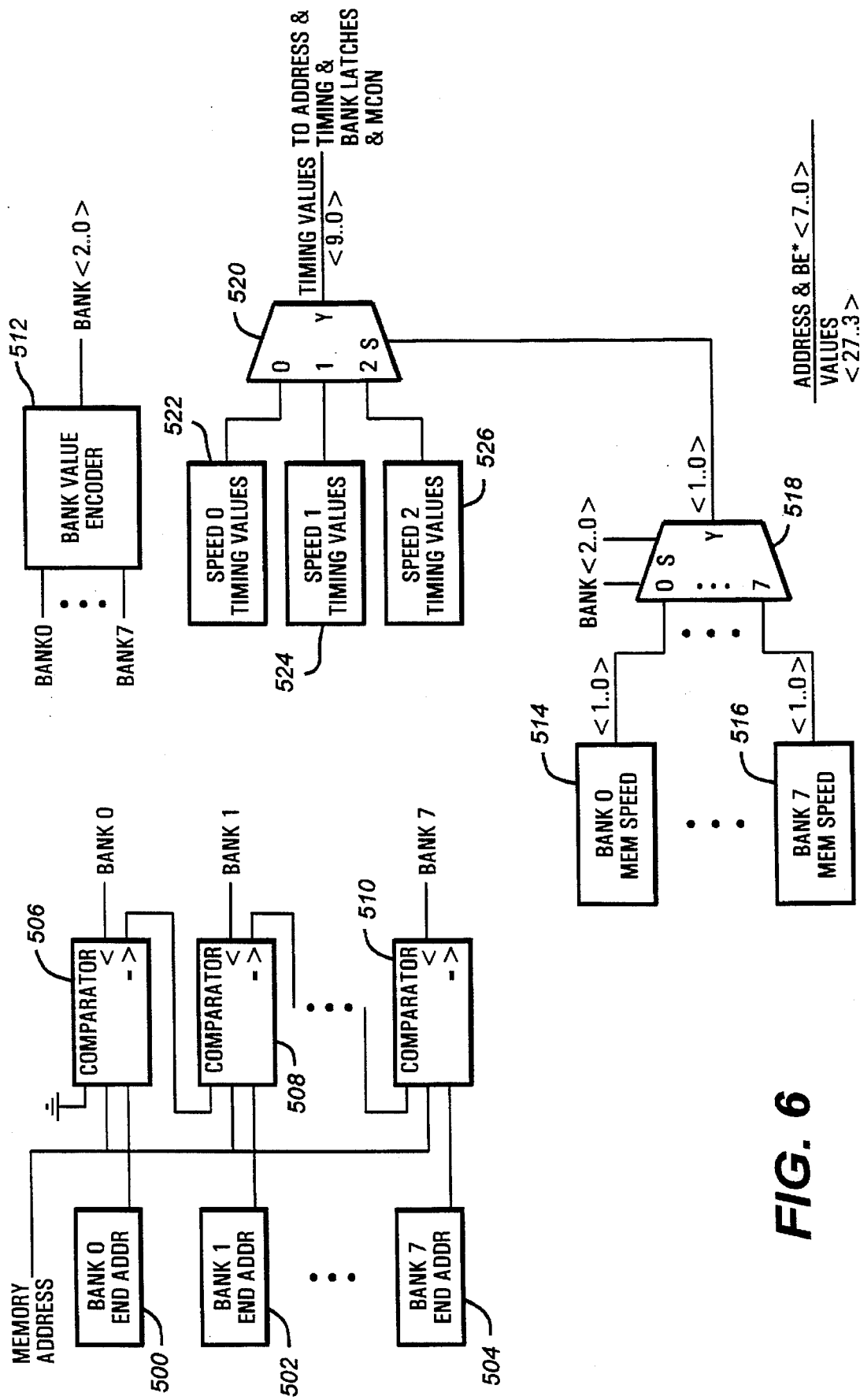
FIG. 6 is a block diagram of the circuitry used to provide memory timing information and addresses for a particular memory cycle the memory controller of FIG. 4.

Referring then to FIG. 6, each memory bank includes a related register 500, 502 and 504 to indicate the ending address of the particular memory bank. These addresses can be written by the processor after determining the particular size of the memory module located in the particular bank. The output of the bank end address registers 500, 502 and 504 are then provided as one input to comparators 506, 508 and 510. A second input to the comparators 506, 508 and 510 is provided by the memory address of the particular module such as the processor bus PB or PCI bus 98 as appropriate. It is noted that only three of the eight banks are shown for simplicity. The comparators 506, 508 and 510 have two outputs and a third input. One output is the less than output, so that if the provided memory address is less than the ending address of the particular bank, and there is a carry in value to indicate enabling of the comparator, the less than value is true or high, indicating that this is the selected bank. The comparator second output is a greater than or equal to signal, which is used to enable the next comparator. For example, comparator 506 has its greater than or equal to output connected to an enable input of the comparator 508 such that if the memory address is greater than or equal to the address provided in the bank 0 end address register 500, the comparator 508 is activated. If the address is then less than the bank 1 ending address as stored in the register 502, then the output of the BANK 1 signal of the comparator 508 is activated. If the memory address is instead higher, then this chain continues to determine if the memory address is less than that contained in any of the banks. Therefore, there are eight particular bank outputs, BANK 0 to BANK 7, to indicate the presence of the memory address in the particular memory bank.

These BANK 0 to BANK 7 signals are provided to a memory bank value encoder 512, which provides the BANK 2:0 signals, which are stored along with the write address values in the I2M queue 410 or P2M queue 408, for provision to the MCON block 404.

As noted above, each bank could be one of three particular memory speeds, and these indications are contained in registers 514 and 516. Only two registers are shown for simplicity. The outputs of the registers 514 and 516 are two bits to indicate the particular speed, and these bits are provided to the inputs of an eight input, 2 bit multiplexor 518 whose select input is connected to the BANK 2:0 signals. The BANK 2:0 signals are provided with the particular address, be it read or write addresses for the PCON block 400 or the ICON block 402, to the multiplexor 518 so that the output of the multiplexor 518 is the particular two bits that indicate the bank for the particular address for which the MCON block 404 is about to execute the a memory operation. The output of the multiplexor 518 is connected to the select input of a 3 input multiplexor 520. The multiplexor 520 is connected to the registers 522, 524 and 526 which contain the memory speed timing values for speed 0, 1 and 2, respectively. These memory timing values are those indicated in Table 1. The output of the multiplexor 520 is timing values as utilized in the state machines and logic described below for the MCON block 404. In addition, the address values 27..3 and byte enable or BE* 7..0 signals are also provided to the MCON block 404 as they have been tracked through the queues 408 or 410 or are provided directly on read operations. Therefore, the memory bank speed timing values are directly provided by first decoding the particular bank, then having a look up for the bank based on the previously defined and stored memory speed value of the optional memory speed settings, and then selecting the particular memory speed values for operation for that particular memory cycle.

An example of the timing values for the preferred embodiment for three processor speeds and two memory device speeds is shown in Table II.

TABLE II

Memory Timing Control Combinations

| Parameter | 33 MHz | | 50 MHz | | 60 MHz | |
|---|---|---|---|---|---|---|
| | 60 ns | 70 ns | 60 ns | 70 ns | 60 ns | 70 ns |
| RAS precharge | 2 | 2 | 3 | 3 | 3 | 4 |
| MRDY assertion state | C1 | C1 | C3 | C3 | C2 | C3 |
| CAS pulsewidth | 2 | 2 | 2 | 2 | 2 | 3 |
| MD Setup | 1 | 1 | 1 | 1 | 2 | 2 |
| Write Column Addr Setup | 1 | 1 | 1 | 1 | 1 | 1 |
| Read Column Addr Setup | 1 | 1 | 1 | 1 | 1 | 1 |
| RA hold | 1 | 1 | 1 | 2 | 2 | 1 |
| Memory Timing Control | 00_00 | 00_00 | 30_00 | 30_01 | 20_11 | 51_10 |

TABLE II-continued

| | Memory Timing Control Combinations | | | | | |
|---|---|---|---|---|---|---|
| | 33 MHz | | 50 MHz | | 60 MHz | |
| Parameter | 60 ns | 70 ns | 60 ns | 70 ns | 60 ns | 70 ns |
| Register (hex value) | | | | | | |

The DRAM device speeds can be determined by reading encoded bits conventionally provided on SIMMs and checking the size. These two parameters are then used in a lookup table to determine SIMM speed. This technique is described more fully in Ser. No. 08/034,105, filed Mar. 22, 1993, which is hereby incorporated by reference. With the DRAM device speed then known for each bank and microprocessor speed known by other encoded bits, these two parameters are then used in a second lookup table to obtain the binary value to be placed in the timing value register for that continuation. The computer system designer knows the various propagation delays of the various paths and can then simply use the clock speed and memory timing parameters provided by the memory device manufacturer to determine the timing values for each combination.

Figure 7:
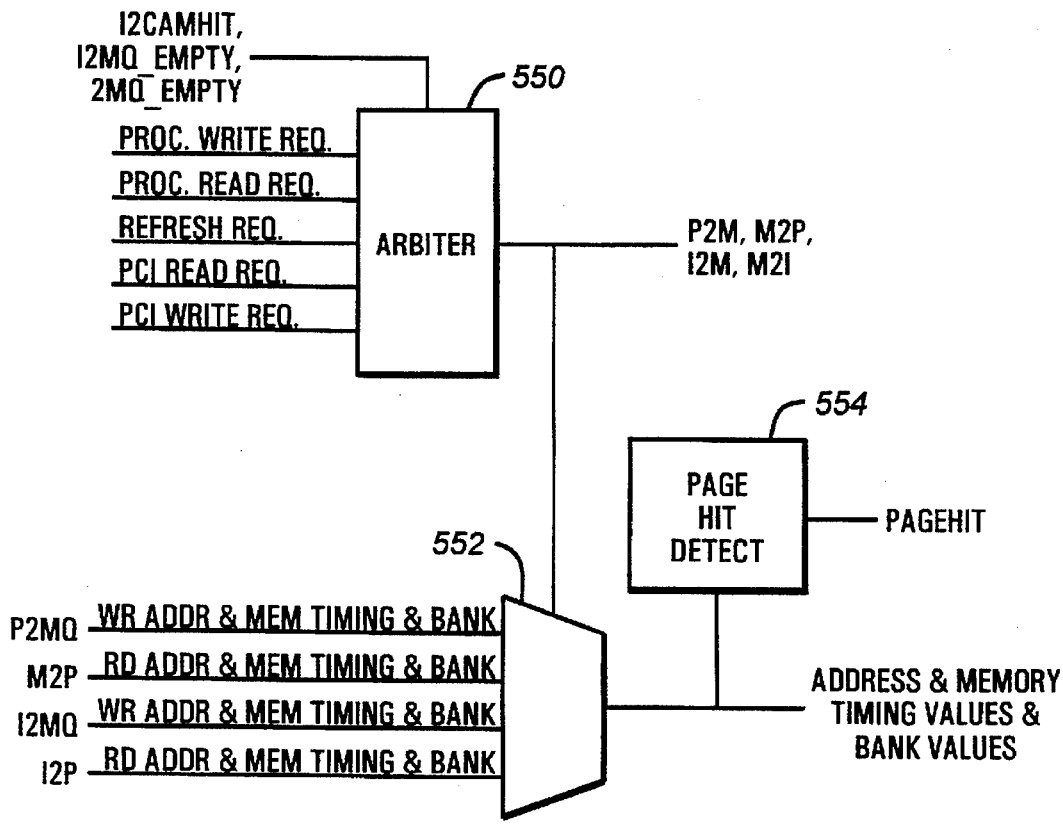
FIGS. 7 and 8 are block diagrams of portions of the memory controller of FIG. 4.

Proceeding then to FIG. 7, the use of the addresses, byte enables and timing values are shown as being provided to a portion of the MCON block 404. The processor write request, processor read request, refresher quest, PCI read request and PCI write request signals are inputs to an arbiter 550 along with signals referred to as I2CAMHIT, I2MQ_EMPTY and P2MQ_EMPTY. The various request signals are an indication that operations are pending for the memory controller to operate on from the indicated sources of the indicated type. Development of these signals is not fully described but can be readily developed by one skilled in the art. The outputs of the arbiter 550 are the P2M, M2P, I2M and M2I signals to indicate which source and direction of operation has occurred, that is P2M for a processor to memory write, M2P for a processor to memory read, I2M for a PCI to memory write operation and M2I for a PCI read operations. These four signals are provided as the select signals to a four input multiplexor 552 which receives the particular read or write addresses, the byte enables, the memory timing values and the bank indications for the particular source. The P2M queue 408 provides write addresses, byte enables, memory timings and bank information from the queue 408 for processor to memory write operations, while the read addresses, byte enables, memory timings and bank information are provided directly for processor reads in the M2P case. Similarly, the I2M queue 410 provides write addresses, byte enables, memory timings and bank information from the I2M queue 410, while the read addressing information is provided directly from the ICON block 402 to the MCON block 404. The output of the multiplexor 552 is the particular address value, the byte enables, the bank value to indicate which particular bank and the memory timing values for the particular memory operation to be performed by the memory controller 210 to access the necessary memory location for either a read or a write as appropriate. It is also noted that a page hit detector 554 is connected to the output of the multiplexor 552 to provide a PAGEHIT signal to allow the memory controller 210 to determine whether a page hit has occurred, so that it can operate the DRAM devices in the desired page mode operation for best performance.

Figure 8:
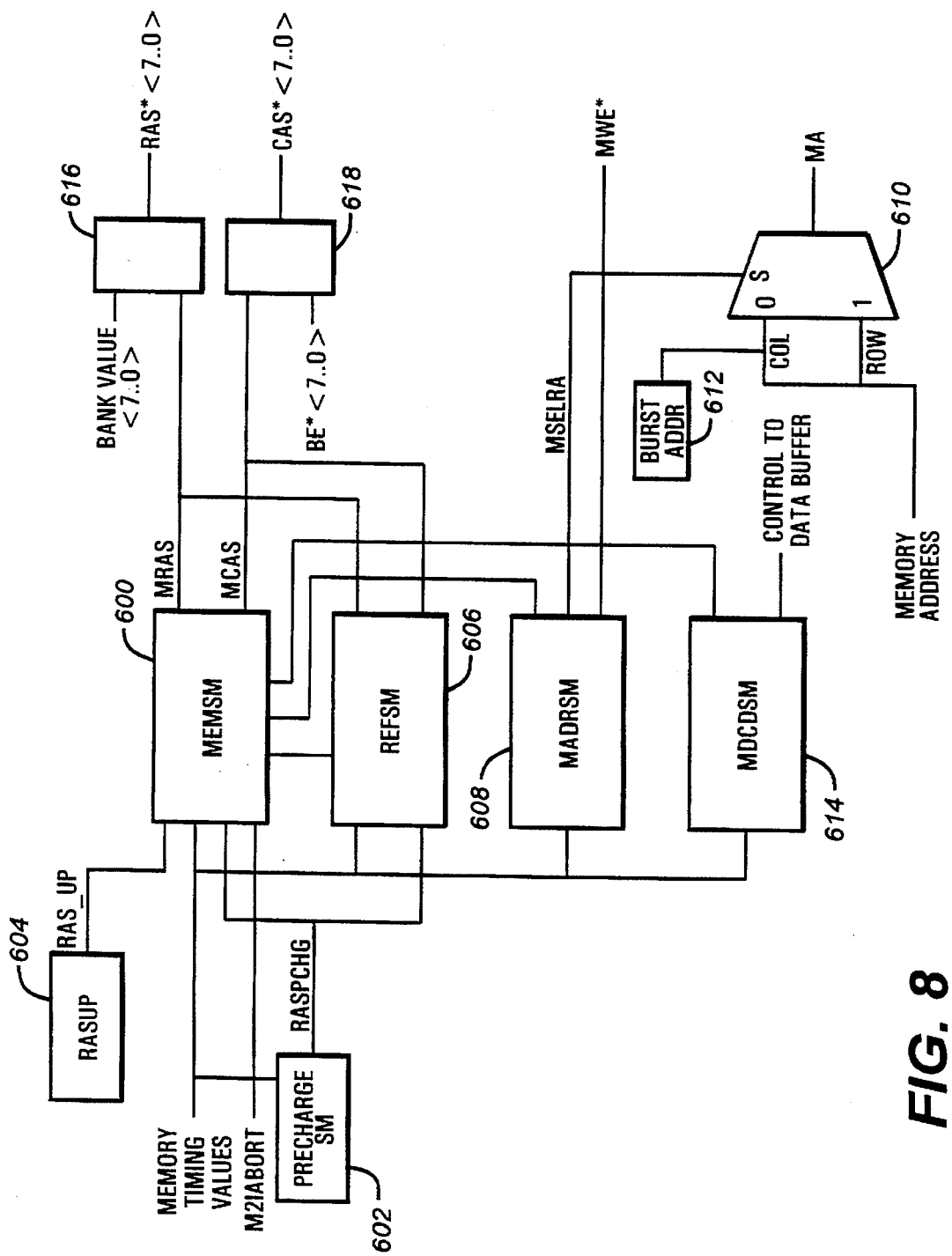

Proceeding then to FIG. 8, blocks representing various state machines and other logic utilized in the MCON block 404 are shown. A number of state machines provide the actual information and control functions and are interlocked. The primary state machine is the MEMSM or memory state machine 600. The memory state machine 600 receives the memory timing values from the multiplexor 552 and the M2IABORT signal from the ICON block 402. A precharge state machine 602 is provided to provide a signal referred to as RASPCHG or RAS precharge to indicate that the precharge time for the particular memory bank is completed if page mode operation is not occurring. The RASPCHG signal is provided to the memory state machine 600. Additionally, RASUP or RAS up logic 604 provides a RAS_UP signal which is utilized by the memory state machine 600 to determine whether to leave the RAS* or row address strobe signal high or low when no memory cycles are pending, thus providing a prediction whether the next operation will be a page hit or page miss to thereby improve performance. Detailed operation of this logic will be described below.

A refresh state machine 606 is provided to control refresh operations but will not be described in detail in this description because its operation is relatively conventional and is omitted for clarity. A memory address state machine 608 receives the timing values from the multiplexor 552, as well as the basic clock signal of the system and provides interlock signals to the memory state machine 600, the MSELRA or memory select row address signal and the MWE* or memory write enable signal. The MSELRA signal is provided to the select input of a 2:1 multiplexor 610 which receives at its inputs the memory addresses appropriately connected to provide row and column addresses based on the selection input. A burst address block 612 is provided and connected to the column addresses to simplify burst operation. The outputs of the multiplexor 610 are the memory addresses provided to the memory array 214 over the memory address bus 216 for the particular operation. The MWE* signal is similarly the memory write enable signal as provided to the main memory array 214. A memory data control state machine 614 is provided. It receives certain of the memory timing values and provides interlock signals to the memory state machine 600 and controls the operation of pertinent portions of the data buffers 212.

The memory state machine 600 provides the MRAS or master RAS and MCAS or master CAS signals. The MRAS signal is combined with the bank value signals for the particular memory operation to provide the RAS* 7:0 signals which are provided to the particular banks. If the bank value indicates that this is the particular bank value for the operation, then the RAS logic 616 directs the MRAS signal to that particular bank in an inverted form. If the bank value is not the one particularly being addressed, then the RAS* signal for that particular bank is held high to allow the memory devices to be fully precharged. The MCAS signal is provided to CAS logic 618 which also receives the BE* 7:0 signals for the preferred 64 bit width. These signals provide the eight byte lanes of information that are encoded with the MCAS signal to produce the CAS* 7:0 signals which are used to enable the particular memory devices of the bank indicated by the RAS* 7..0 signals. If a particular byte enable is not activated, then its related CAS* signal is not activated, and therefore the memory device is not selected as it does not receive a column address. This allows the use of a single MWE* signal, with the CAS* signal providing the byte lane encoding.

The queues 406, 408 and 410 are organized as a series of registers of the appropriate width. Particular registers in each queue are selected based on three particular counter values associated with each queue. The three counters are the read location counter, the write location counter and the data contents counter. The read location counter is utilized to determine the particular location of the four or eight registers from which the read data for the next cycle is to be obtained and provided to the particular block. The write location counter is utilized to indicate the particular register into which data is to be written in the next operation. The read and write location counters increment on each read and write operation, respectively, and thus operate in a circular fashion. The data contents counter is utilized to indicate whether there is actually data in the queue. The data contents counter is an up/down counter. The data contents counter counts up on a write operation to the queue and decrements on read operations. If the data contents counter indicates that the queue is full by being at a maximum value, then data is not written into the queue until data has been removed from the queue. These counters are conventional logic and are not shown for simplicity and clarity. I2MQ_EMPTY and P2MQ_EMPTY signals thus correspond to the data contents counters being at a zero value.

Figure 9:
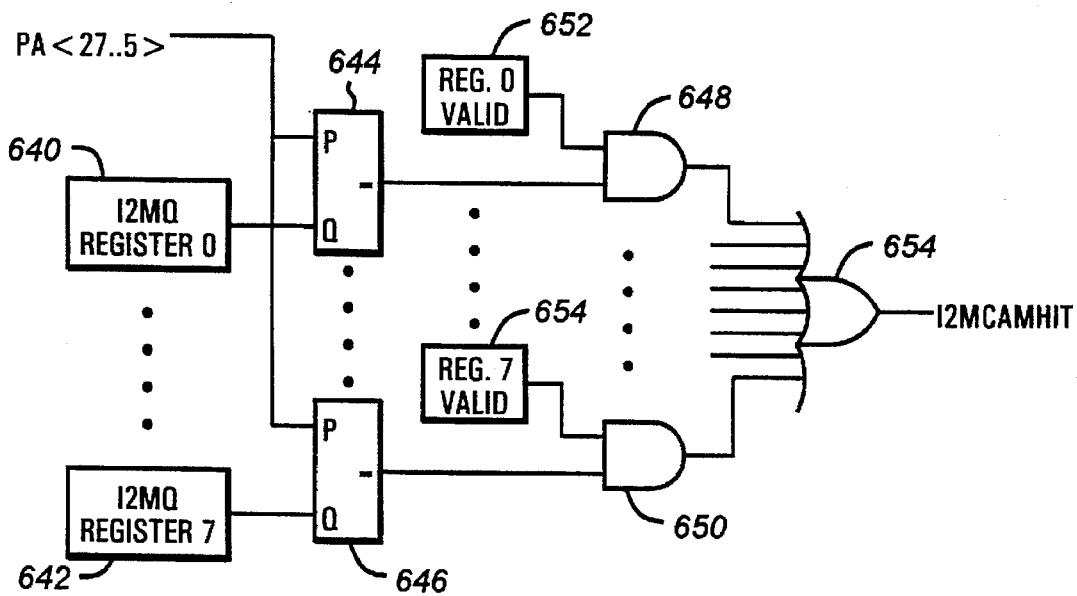
FIG. 9 i a block diagram of the CAM hit detection logic of the memory controller of FIG. 4.

Because of the length of the I2M queue 410, it is organized as a content addressable memory or CAM. I2M queue registers 640 and 642 are shown in FIG. 9, with many omitted for simplicity. The output of the particular register 640, 642 is not only provided to the MCON block 404 via a multiplexer but is also provided to an associated comparator 644 and 646. The second input of the comparator 644 and 646 receives the processor address being provided on the processor address bus 204. The comparators 644 and 646 have equal outputs so that if the address being provided directly on the processor address bus 204 is equal to one of the addresses contained in the I2M queue 410, then the particular comparator provides its equal signal true. The equal signal output goes to one input of an AND gate 640 and 650. The second input to the AND gate 640 and 650 is provided by a valid bit register 652 and 654. If data is not contained in the particular register 640, 642 in the I2M queue 410, then the valid bit register is set to 0, whereas if data is present, then the bit is set to 1. These valid bit registers are set when data is written into the I2M queue 410 and cleared when data is read out of the queue 410. In this manner, if the register is valid and the comparator determines that there is an equality, the output of the particular AND gate is set to a one value to indicate that a hit has occurred. The outputs of the AND gates 648 to 650 are provided to an eight input OR gate 654 whose output is the I2MCAMHIT signal, which is provided to indicate that the particular read address being requested by the processor is actually present in the I2M queue 410 as a write operation from the PCI bus 98, and therefore the memory read request from the processor 200 cannot occur until the particular location has been flushed out of the I2M queue 410. Operation of this delay is seen in the arbiter 550 as described below.

In the preferred embodiment, there are five possible requests for the main memory 214: a processor-to-memory write (P2M), a memory-to-processor read (P), a PCI-to-memory write (I2M), a memory-to-PCI read (M2I), and refresh. A P2M write refers to a write to the memory 214 and a M2P read refers to a read of the memory 214, both initiated by the microprocessor 200. An I2M write refers to a write to the memory 214 and a M2I read refers to a read of the memory 214, both initiated by a PCI bus master. All memory requests from EISA bus masters are passed through the PCI-EISA bridge 130, which includes the necessary logic to be a bus master on the PCI bus 98. Thus, any EISA originated memory request is effectively a memory request asserted by the PCI-EISA bridge 130.

Generally, the priority of the memory requests are as follows, with some exceptions: (1) second refresh request; 2) P2M write request; (3) M2P read request; (4) I2M write request; (5) M2I read request; and (6) first refresh request. The second refresh request indicates that two refreshes are outstanding. When that occurs, the memory controller 234 gives both outstanding refresh requests the highest priority, executing both refresh cycles. The P2M write request is always higher in priority than other memory requests except the second refresh. However, if the I2M queue 410 is full or the I2M queue 410 is not empty and a PCI bus 98 read is outstanding, a signal M_P2_M_NOPOST is asserted to prevent further queuing of P2M write requests until a PCI write operation is completed. This allows the P2M queue to clear out, thereby allowing requests from the PCI bus 98 to be serviced. However, assertion of the signal M_P2M_NOPOST does not prevent writeback cycles from being queued, as the writeback may be needed by the PCI memory request.

The M2P read request is always lower in priority than the P2M write request, but it is usually higher in priority than I2M write and M2I read requests. The operation can only occur when the P2M queue 408 is empty. However, an unlocked M2P read request is forced lower in priority than an I2M write request if the M2P read is to the same address as an I2M write pending in the I2M queue. When this occurs, the M2P request remains lower in priority than I2M requests until the I2M write request having the matching address is written to the main memory 214. A M2P read request is also forced lower in priority than an I2M write request if the I2M queue is full. Additionally, if an M2I read request is asserted while an I2M write request is pending, the I2M write request is forced higher in priority than the M2P read request to allow the I2M queue to clear, thereby allowing the M2I request to proceed. Further, an M2I read request is forced higher in priority than the M2P read request if the M2I read has been waiting for the M2P request to negate for more than one arbitration cycle.

The I2M write request is always lower in priority than the second refresh request, the P2M write request, and it is generally lower in priority than the M2P read request with the exceptions noted above. The I2M write operation can only occur when the P2M queue 408 is empty. The I2M write request is always higher in priority than the M2I read request. The I2M write request is held off if the processor is performing a locked access of the main memory 214. Thus, for a locked processor cycle, the exceptions discussed above do not apply to override the higher priority of M2P read requests over I2M or M2I requests.

A locked or atomic access of the main memory 214 is indicated by a signal LOCK, driven by the microprocessor 200. A locked cycle allows the microprocessor 200 to read an address location in the main memory 214 and be assured that the accessed location is not changed by another bus master before the microprocessor 200 writes back to the same memory location. These type cycles are referred to as read modify write cycles. Locked cycles are also generated during other bus transfers, such as during execution of the XCHG (exchange) instruction when one of its operands is memory-based, when updating a segment or page table entry, and when executing interrupt acknowledge cycles.

The M2I read request is always lower in priority than the second refresh request, the P2M write request, and the I2M write request. However, it is higher in priority than the unlocked M2P read request in the instance noted above. The M2I read operation can only occur when the P2M queue 408 is empty.

Finally, the first refresh request is always lower in priority than any of the other requests. However, as noted above, when the second refresh request is asserted, both the first and second refresh requests are executed regardless of whether other requests are pending.

Further details of this arbitration are provided in Ser. No. 08/323,011, entitled System for Arbitrating Access to Memory filed concurrently herewith, which is hereby incorporated by reference.

Figure 10:
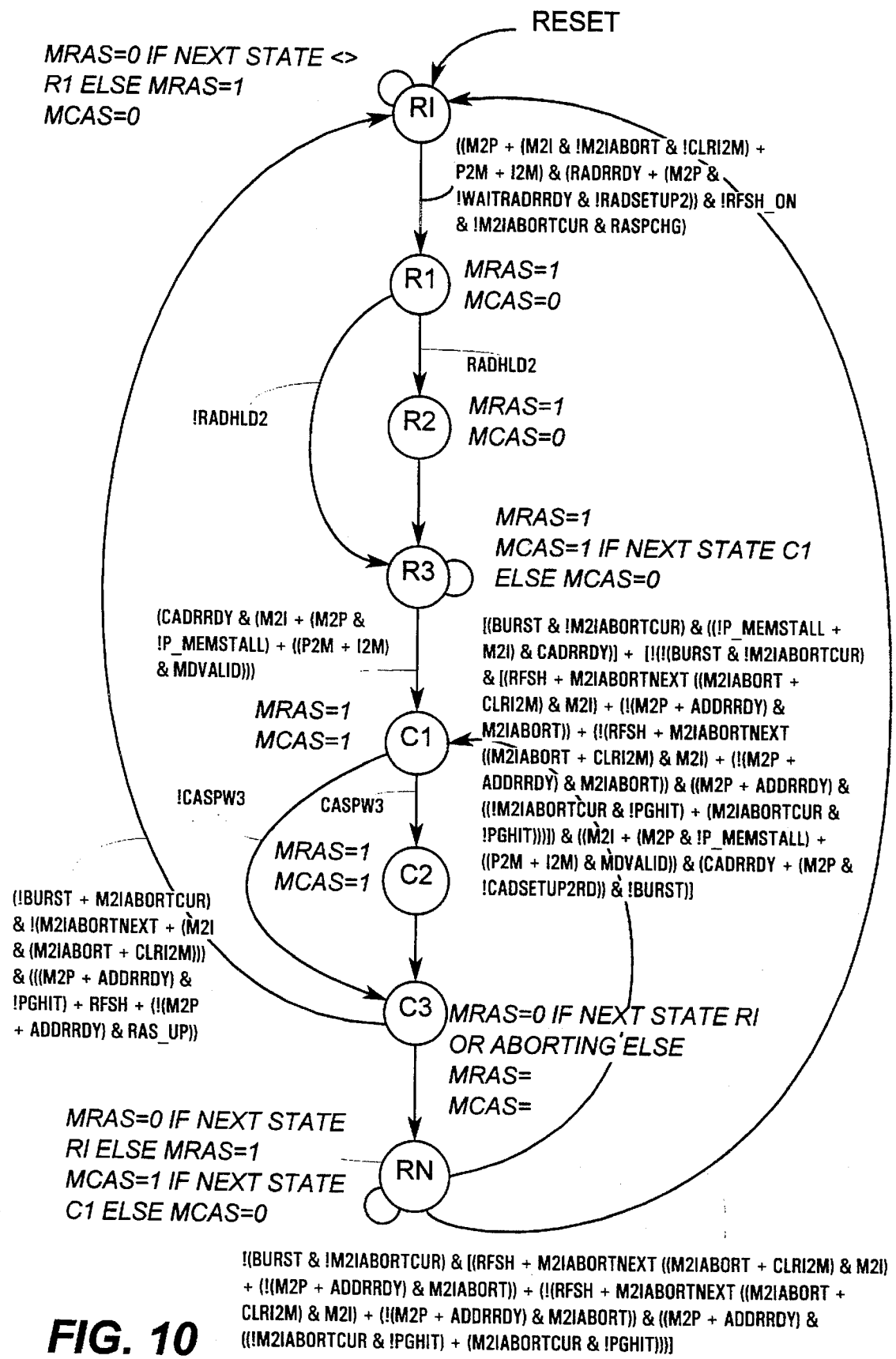
FIG. 10 is a state machine diagram of the memory state machine.

Referring now to FIG. 10 the memory state machine 600 is shown in detail. Indications in italics next to a particular state bubble indicate the value of various output signals, developed by the state machine. In this case the MRAS and MCAS signals. The phrases adjacent to an arrow going from one bubble to an other are the logical conditions on which that path is taken. If a path does not have an adjacent logical condition, that path is taken in all other cases. Transitions are made on the rising edge of the processor clock signal. Upon reset of the computer, operation of the state machine 600 transfers to the RI or RAS idle state. In this state the MRAS signal is not asserted if the next state is not state R1. If the next state is R1, then the MRAS signal is set to the value 1 or asserted so that the row address strobe signal is provided. The MCAS signal is negated to a zero level. Control proceeds from state RI to state R1 if the M2P condition is true so that a processor read operation is occurring, if a PCI read operation is occurring (M2I) which has not been aborted (!M2IABORT) and is not being cleared (!CLRI2M), or if a write operation from the processor or the PCI bus is occurring; the row address ready signal (RADRRDY) is true, which indicates that the row address set up time to the RAS signal has been met as indicated by the memory address state machine 608, or, if in a processor read case there is no wait signal indicated as would be appropriate if an aborted memory to PCI read ahead is completing (WAITRADRRDY) and the row address set up time two (RADSETUP2) signal is not activated which indicates that relatively fast memory is present; a refresh cycle is not occurring (RFSH_ON); the current read cycle to the PCI bus 98 is not being aborted (M2IABORTCUR); and the precharge period has completed for as indicated by the RASPCHG signal. The M2IABORT signal is provided by the ICON block 402 as described above. The M2IABORTCUR signal indicates that the cycle currently being performed by the MCON block 404 is to be aborted or terminated as soon as possible. The M2IABORTNEXT signal indicates that the next M2I cycle which is pending is to be aborted, which occurs by simply skipping the cycle. The development of the CLRI2M signal is detailed below, but briefly indicates that a snoop read hit to a modified location has occurred, so that the I2M queue 414 must be flushed and the read cycle reexecuted. Therefore, if a memory cycle is indicated, the row address set up time has been met, and the device is precharged, control proceeds in state RI to state R1. In all other cases control remains at state RI.

In state R1 the MRAS signal is set to 1 or high and true, and the MCAS signal is set low to indicate that this is a RAS only portion of the cycle. Control proceeds from state R1 to state R2 if the RADHLD2 signal is true, which indicates that two clock periods of hold time are required and therefore the intermediate R2 state is required. If the RADHLD2 signal is not true, then only 1 clock of hold time is required from the activation of the RAS* signal and control proceeds directly from state R1 to state R3. In state R2, the MRAS signal is asserted and the MCAS signal is negated. Control proceeds from state R2 to state R3 on the next rising edge of the processor clock signal.

In state R3, the MRAS signal is true or high, while the MCAS signal is set high if the next state is to be state C1 and otherwise the MCAS signal is set low. Control proceeds from state R3 to state C1, the first of the column states, if the column address ready (CADRRDY) signal is true as provided by the memory address state machine 608 to indicate that the particular column address set up time, be it read or write, has been satisfied and either a PCI read operation is occurring or a memory to processor bus read operation is occurring, and the memory operation is not stalled waiting for read data; or a write operation from the processor to memory or the PCI bus to memory is occurring with the data being valid as indicated by the MDVALID signal which is provided by the memory data state machine 614. Therefore, if the column address set up time has been met and indication of write operation data being properly valid for write cases is provided, control proceeds from state R3 to state C1. Otherwise, control remains in state R3 waiting for the timing conditions to be satisfied.

In state C1, both the MRAS and MCAS signals are high to indicate that the CAS portion of the cycle is occurring. Control proceeds from state C1 to state C2 if the CASPW3 or CAS pulse width 3 clock signal is true. If the CASPW3 signal is not true, control proceeds directly from state C1 to state C3, with control always proceeding from state C2 to state C3 on the next rising edge of the processor clock signal. In state C2, the MRAS and MCAS signals are both also true. Thus, state C2 is skipped if the CAS pulse width can be narrower, as would be true for faster memory or slower processors with an additional clock period provided when necessary.

In state C3 the MCAS signal is negated to a 0 level to indicate completion of the particular memory cycle and the MRAS signal is set to 0 if the next state is the RI state or if the particular cycle is aborting. Otherwise, the MRAS signal remains in a high or asserted state to allow operation in page mode if appropriate. Control proceeds from state C3 to state RI if a burst operation is not occurring, which is a preferable operation for 486 and Pentiun processors, or the current memory to PCI read cycle is being aborted as explained below; the next memory to PCI read operation is not aborted; there is no indication that the M2I cycle is to be aborted as indicated by the M2IABORT signal or the CLRI2M signal; and a non-refresh cycle is occurring (M2P+ ADDRRDY) and this is not a page hit; a refresh cycle is occurring or there is no cycle pending and the RAS_UP signal is true, indicating that the RAS_UP block 604 has indicated that the prediction is for the next cycle to be a page miss. The RAS_UP signal is generated as follows:

RAS_UP = !((!WRITEBACK && P2M)    (!MDATARD && M2P)
              (!Q_I2MQEMPTY && I2M)    (!M2IABORTCUR &&
              M2IMULREAD && !M2IABORTNEXT)    HIT2MOD)

Therefore, the RAS* signal is kept low or in page mode following processor to memory write operations which were not writebacks from the L1 or L2 caches, processor code read operations, PCI bus write operations with pending write operations, Memory Read Multiple operations from the PCI bus 98 which are not being aborted, or hits to a modified address, indicating that a writeback operation has just occurred. In all other cases the RAS_UP signal is true, such that it is considered better to initiate a full new page access to allow precharging to occur during the idle period.

If the conditions for transfer from state C3 to RI are not true, control proceeds from state C3 to state RN or the RAS low idle state. In this state the MRAS signal is low if the next state is state RI otherwise the MRAS signal is asserted. The MCAS signal is asserted if the next state is C1, otherwise the MCAS signal remains in low state. Control proceeds from the RN to C1 state for burst operations in general if the column address set up time has been met and there are no abort operations occurring. Control proceeds from the RN state to the RI state under conditions which generally indicate that the cycle is being aborted or a processor non-burst read which is a page miss is next to occur. In all other cases, control remains at state RN, idling with the RAS* signal low until a cycle needs to be run or an abort or page miss occurs. Therefore, it can be seen that the memory state machine 600 drives the MRAS and MCAS signals based on the timing values of the proper bank, these timing values being variable as indicated above.

Figure 11:
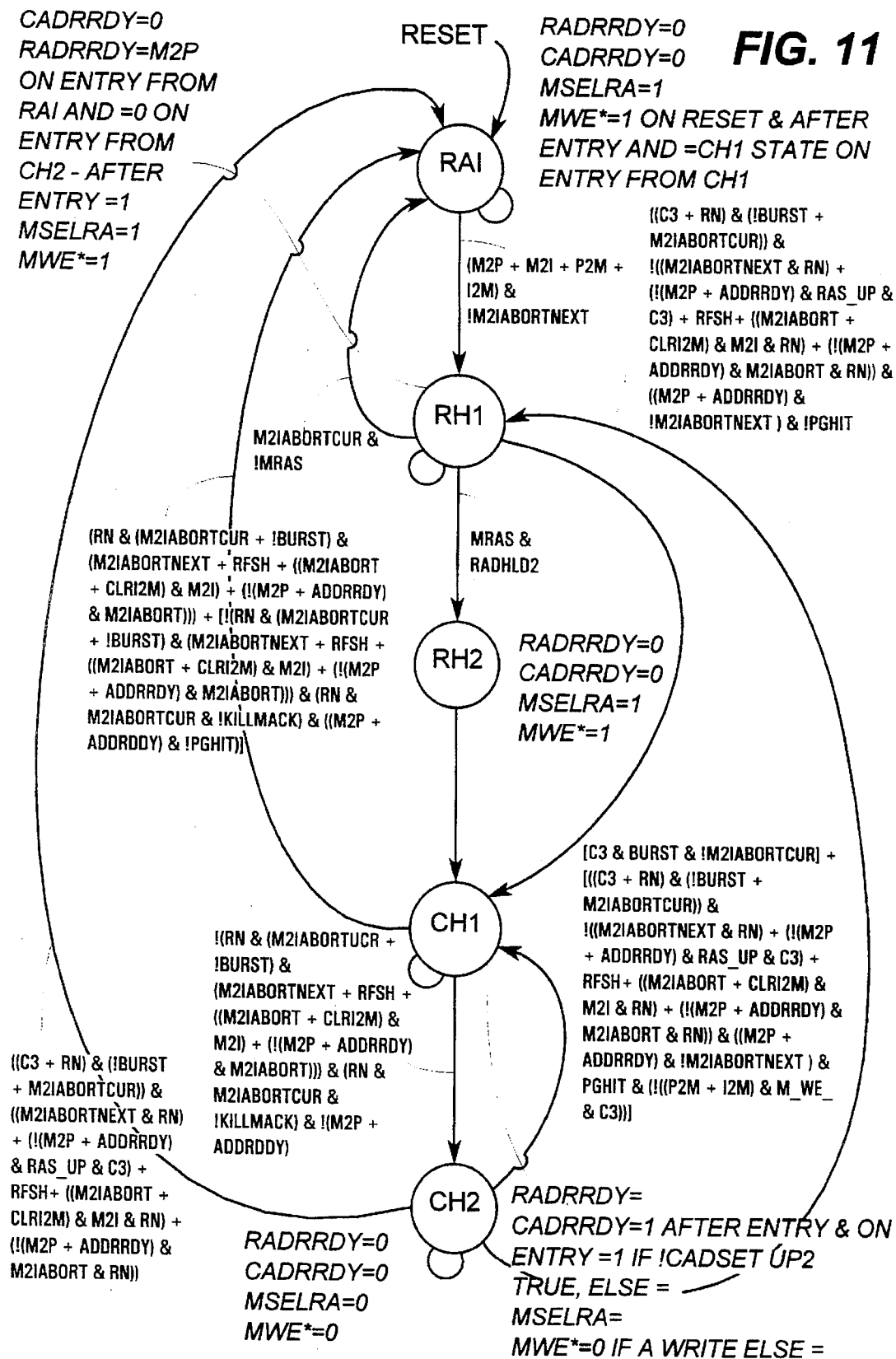
FIG. 11 is a state machine diagram of the memory address state machine.

A memory address state machine 608 is shown in FIG. 11. The state machine 608 starts at state RAI upon reset. In this state, the RADRRDY signal and CADRRDY signals are set low to indicate that the row and column addresses are not ready, and the MSELRA signal is set high to initially select the row address to be provided to the memory devices. The MWE* signal is set to 1 or negated level on reset and after entry into the RAI state and is set equal to the CH1 state value the first state after entry from the CH1 state as described below. Control proceeds from the RAI state to the RH1 state if an active cycle is pending from the PCI bus 98 or processor 200 and the next cycle in the read ahead operation is not to be aborted. The current M2I read cycle is aborted under certain conditions, such as receipt of M2IABORT signal or a writeback is occurring, while the next M2I read cycle is aborted when the M2INA signal has been received but the cycle not started when the M2IABORT signal is received. In all other cases control loops at state RAI.

In state RH1 the CADRRDY signal is set low and the RADRRDY signal is set to the value of M2P or memory to processor read upon entry from the RAI state, is equal to 0 on entry from the CH2 state as defined below and after entry into the RH1 state is set to a 1 level. The MSELRA and MWE* signals are set to high levels so that the row address is selected and a write operation is not indicated. Control proceeds from the RH1 to the RH2 state if the MRAS signal is true from the memory state machine 600 and the RADHLD2 signal or row address hold time signal is set to indicate slower memory devices. If the MRAS signal is true and the RADHLD2 signal is not set, control proceeds from the RH1 state directly to state CH1, which is also where control proceeds on the next clock signal in the RH2 state. In all other cases, operation loops at the RH1 state. In the RH2 state, the RADRRDY signals and CADRRDY signal are set low, and the MSELRA and MWE* signals are set at high state. Control proceeds from the RH2 to the CH1 state.

In the CH1 state, the RADRRDY signal is low to indicate that the row address set up time has not been met. The CADRRDY signal is set to a high or true value after initial entry into the state. On entry the CADRRDY signal is set high if short CAS address setup times were set (!CADSETUP2) for the read or write as appropriate, and otherwise is set low. The MSELRA signal is set to 0 to indicate that the column addresses are selected and the MWE, signal is low if a write operation is occurring.

Control proceeds from the CH1 state to the RAI state if the memory state machine 600 is in state RN and either the cycle is aborting or a processor read page miss is pending. Control proceeds from the state CH1 to state CH2 if the memory state machine is not in state RN or the cycle is not aborting completely or the processor read cycle is a page hit.

In the CH2 state the RADRRDY and CADRRDY signals are set low to indicate that no addresses are ready. The MSELRA signal is set low and the MWE* is set low to indicate the write operation is occurring and the column addresses are provided. Control proceeds from the CH2 state to the CH1 state for ongoing burst cycles when the memory state machine is in state C3 or for pending processor read page hit operation. Control proceeds from the CH2 state to the RAI state if the cycle is aborting or if an idle condition is present and the RAS* signal is to be set high. Control proceeds from the CH2 to the RH1 state if a processor read page miss operation is to occur and the memory state machine 600 is at the end of a cycle.

Therefore the memory address state machine 600 properly provides the MWE* signal for the DRAM devices and controls the address multiplexor 610. In addition, the RADRRDY and CADRRDY or row and column address ready signals are provided to the memory state machine 600 based upon the column and row address set up times as provided in the memory timing registers.

Figure 12:
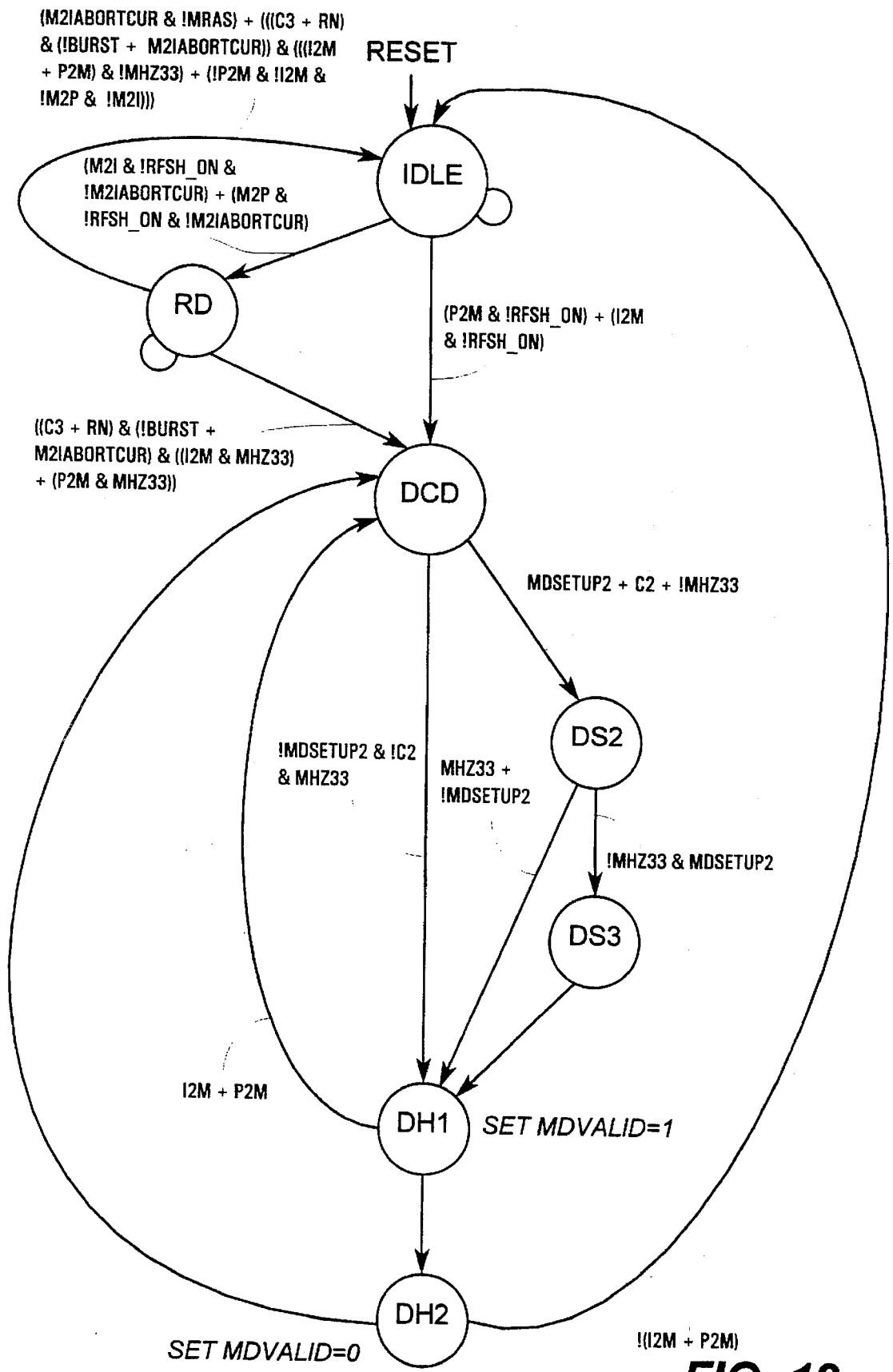
FIG. 12 is a state machine diagram of the memory data state machine.

The MD or memory data state machine 614 is illustrated in FIG. 12. The state machine 614 starts at the IDLE state upon reset. Control proceeds from the IDLE state to a RD state for processor or PCI bus 98 read operations which are not being aborted and refresh is not occurring. Control proceeds to the DCD state if a processor to memory write operation is occurring and there is no refresh or if a PCI bus to memory write operation is occurring and again there is no refresh. Control otherwise remains at the IDLE state. Control proceeds from the RD state to the DCD state if the memory state machine is in states C3 or RN, the cycle is either being aborted or is not a burst cycle and it is a write operation with a 33 MHz processor. Control proceeds from the RD state to the IDLE state if MRAS is negated and the cycle is aborting or the memory state machine is in states C3 or RN, the cycle was not a burst or is aborting, and a non-33 MHz processor write operation or PCI bus 98 write cycle is pending or no cycles are active. In all other cases, control remains at state RD.

Control proceeds from the DCD state to the DH1 state if the MDSETUP2 signal is not true, indicating that this is a fast memory data set up case, and the memory state machine 600 is not in state C2 and 33 Mhz operation is indicated for the processor. In all other cases, control proceeds from the DCD state to the DS2 state. Control proceeds from the DS2 state to a DS3 state if the processor 200 is not operating at 33 Mhz and the MDSETUP2 signal is set to indicate slower memory data set up times. Control proceeds from the DS2 to DH1 states in all other cases. Control proceeds from the DS3 state to the DS1 state on the next rising edge of the clock signal.

In the DH1 state, the MDVALID signal is set to 1 or asserted to indicate that the memory data set up time to the column address strobe has been met. This allows the memory controller state machine 600 to proceed to state C1. Control proceeds from the DH1 state to the DCD state if further write operations are pending and otherwise proceeds to the DH2 state. In the DH2 state, the MDVALID signal is set to 0 to indicate that the memory is no longer valid. The value of the MDVALID signal is not changed in any states other than the DH1 and DH2 states, except it is cleared on reset. Control proceeds from the DH2 state to the IDLE state if no write operations are pending from the PCI bus 98 or from the processor 200. In all other cases, control proceeds from the DH2 state to the DCD state. In this manner, the memory data state machine 614 provides the MDVALID signal to the memory state machine 600 when the memory data is properly set up.

Figure 13:
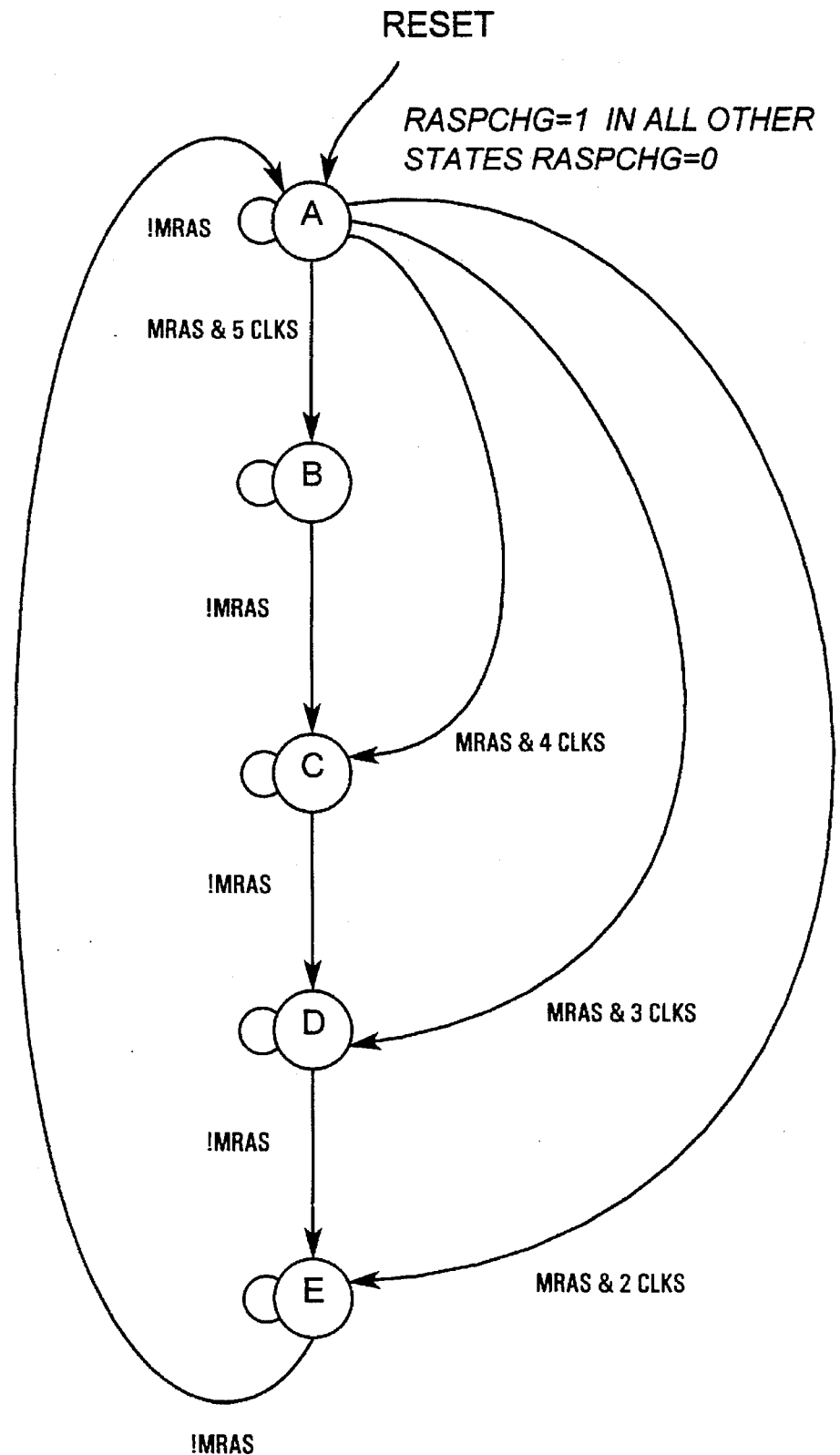
FIG. 13 is a state machine diagram of the precharged state machine.

The precharge state machine 602 is shown in FIG. 13. Upon reset, the state machine 602 operation commences at state A. Control remains in state A when the MRAS signal is not asserted. When the MRAS signal is asserted, control proceeds to one of states B, C, D, or E, dependent upon the number of clocks defined for the precharge time. Control proceeds to state B for five clocks, to state C for four clocks, to state D for three clocks and to state E for two clocks. Control proceeds from states B to C to D to E, sequentially, when the MRAS signal is not asserted. Otherwise, control remains in each particular state. Control then proceeds from state E back to state A when the MRAS signal is deasserted. Therefore the precharge state machine 602 leaves state A upon the commencement of a particular memory operation and then does not begin traversing the remaining states until the MRAS signal has been negated, so that a precharge period has started. It is noted that this results in the proper precharge time for any given bank, even if banks are being switched in sequential memory operations if refresh operations are ignored. This occurs because, as noted above, when a particular bank is not selected the RAS* signal for that bank is set high so that it is in a precharge period. Thus if the bank is not selected, it has been through at least one full memory cycle of precharge, which is sufficient to provide the required recharge in all cases. Thus, the precharge time is set for that of the particular memory bank on which the current cycle is operating, so that if back to back cycles occur on that particular memory bank, the memory devices are properly precharged.

However, refresh operations somewhat degrade this operation as it is not known in the preferred embodiment which bank will be requested after a refresh cycle, so to simplify the design of the preferred embodiment, the precharge value for all of the DRAM types is set to the worst case by the initialization or POST software. This reduces performance in certain cases but simplifies the design. A slightly more complicated design would use the worst case value, preferably provided to a predetermined register for only the first precharge operation after a refresh cycle and thereafter operation would revert to the optimal timing for each bank.

Figure 14:
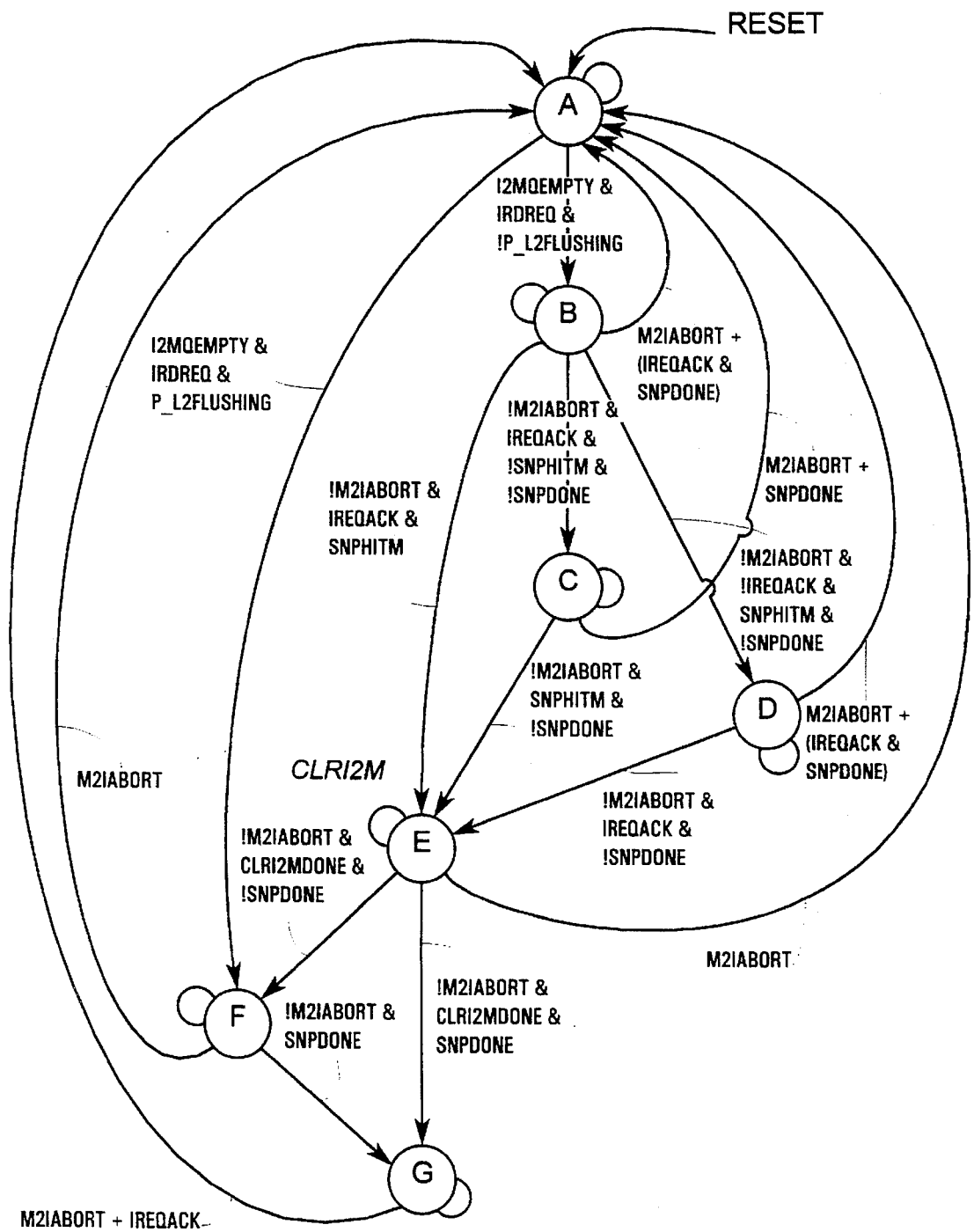
FIG. 14 is a state machine diagram of the memory to I/O state machine.

Write addresses and data traverse through the I2M queues 410 and 414 based on having posted data and the arbiter 550 providing access to the queues 410 and 414 by the memory system. The write addresses are provided to the PCON block 400 when placed in the I2M queue 410, to allow the PCON block 400 to control snooping of the address by the L1 and L2 cache controllers. Read operations occur in a different fashion than write operations. Read addresses are provided to the MCON block 404 along with an indication that a read request has issued. The read addresses are provided based on a return of an L2 cache line, which is 4 32 bit words for 486 microprocessors and 8 32 bit words for Pentium processors. Therefore, when an M2I read is requested, four or eight 32 bit words are provided, with the ICON block 402 properly providing the data from the read operation to the PCI bus 98 as required. The read request indications are provided by a memory to PCI next address state machine described below. The read request is also provided to the arbiter 550 for arbitration and to the PCON block 400 to allow L1 and L2 cache snooping with a writeback in case of a hit to a modified line. When the arbiter 550 provides the approval to proceed with the PCI bus 98 read, the MCON block 404 then proceeds to process the information. It is noted that this will have occurred only after the I2M queues 410 and 414 are emptied of any pending write operations so that the I2M data queue 414 provided in the data buffer 212 can be utilized to do a block read operation of the lengths indicated. Therefore, when the I2M queues 410 and 414 are emptied, the read operation commences and is controlled by an M2I state machine as shown in FIG. 14. The state machine commences at state A upon reset. Control then proceeds to state B if the I2M queue 414 is empty, a read is requested and the L2 cache 208 is not being flushed. This would be a normal read condition. If instead, the L2 cache 208 is being flushed, control then proceeds from state A to state F, assuming that the I2M queue 414 is empty and the read request is present. Otherwise control remains at state A waiting for the read operation to be initialized.

From state B, control proceeds to one of four different states. Control returns to state A if the M2IABORT signal has been received, indicating that the PCI bus master has aborted the read operation, or if the IREQACK signal is true, which indicates that the next operation as determined by the arbiter 550 will be a PCI read, and the SNPDONE signal is true indicating that the PCON block 400 has completed snooping the read operation address to the level 2 cache and to the level 1 cache in the processor 200. Control proceeds from state B to state C if the M2IABORT signal is not asserted, the next cycle is a PCI read as indicated by the IREQACK signal being asserted, there has not been a snoop hit to a modified (SNPHITM) location as indicated by the PCON block 400 and the snoop operation has not been completed, as also indicated by the PCON block 400. This will be the case where a read operation has been requested and has been arbitrated but may have to be aborted because the snoop operation has not been performed and a hit to a modified location may yet occur. Control proceeds from state B to state D, if the operation is not being aborted and a PCI read has not been arbitrated, but there has been a snoop hit to a modified location with the writeback operation not yet completed. Control proceeds from state B to state E if the cycle is not aborted, has been arbitrated as indicated by the IREQACK signal and there has also been a snoop hit to a modified location, so that a writeback operation from the appropriate cache controller will be occurring. In all other cases control remains at state B.

Control proceeds from state C back to state A if the cycle is being aborted or if the snoop is completed without being a hit to a modified location. Control proceeds from state C to state E if the cycle is not aborted and there has been a snoop hit to a modified location. Otherwise, control remains at state C until the snoop operation is completed, the cycle is aborted or there is a snoop hit to modified. Control proceeds from state D back to state A if the operation is aborted or upon indication that the PCI cycle is next for operation and the snoop has completed. This would occur after the writeback has been completed and then the PCI operation is next to occur, as the write back will have superseded the PCI operation. Control proceeds from state D to state E if it is not being aborted, the PCI request is next and the snoop has not been fully completed. Otherwise control remains at state D.

In state E, the CLRI2M signal is set to indicate to other portions of the memory controller 210 that because of the writeback, the data in the I2M queue 414 must be flushed and discarded. A CLRI2MDONE signal indicates this flushing has been completed. Control proceeds from state E to state F if the cycle is not being aborted and the signal CLRI2MDONE or clear the queue done signal is true and the snoop is not yet completed. Control proceeds from state E to state G if the cycle is not being aborted, the clearing of the queue 414 has been completed and snoop has been performed. Control proceeds from state E to state A if the cycle is being aborted and in all other cases remains at state E.

Control proceeds from state F to state G if it is not being aborted and the snoop cycle has been completed. Other control proceeds from state F back to state A if the cycle is being aborted. Otherwise control remains at state F. Control proceeds from state G back to state A if the cycle is aborted or if it is next in line as indicated by the IREQACK signal.

Therefore, the M2I state machine controls transfer of information from the memory to the PCI interface using the I2M queue 414 located in the buffer 212. Data is not transferred until the queue 414 is cleared of any write data and then proceeds only based on snoop information and when the arbiter 550 allows it to proceed.

As noted above, the design of the preferred embodiment performs read ahead operations when a PCI Memory Read Multiple operation has been received. The operation proceeds as follows. The ICON block 402 receives a Memory Read Multiple cycle form the PCI bus 98 and when there is room in the I2M queue 414 issues an M2I read cycle request, along with an address, to the MCON block 404. The MCON block 404 arbitrates as described above and ultimately starts on the M2I read request. When it has started the operation, it provides a next address or M2INA signal to the ICON block 402 and provides the data to the I2M queue 414 along with the appropriate ready signals. The ICON block 402 knows a Memory Read Multiple command is occurring and issues another M2I read cycle request at the next address when the M2INA signal is received and the I2M queue 414 can receive another cache line of data. The ICON block 402 also receives the ready signals from the MCON block 404 and provides the data to the PCI bus 98. The MCON block 404 receives the M2I read cycle request and executes it when the cycle wins the arbitration. Conventionally this will be before the ICON block 402 has removed all of the data from the I2M queue 414 for the initial read request. The MCON block 404 then commences the read request and issues another M2INA signal. The MCON block 404 then provides the data to the I2M queue 414. The ICON block 402 receives this M2INA signal and again checks to see if there is space available in the I2M queue 414 to receive another cache line. When there is room because the ICON block 402 has provided sufficient data to the PCI bus 98, the next M2I read request is provided to the MCON block 404. This process continues until either the Memory Read Multiple completes, a page boundary is crossed or the PCI bus master aborts the cycle.

The abort case is the one of interest as the pending read ahead operation is terminated as soon as possible to save retrieving the entire cache line. This can be seen in the discussions of the MEMSM 600, the MADRSM 608, the MDCDSM 614 and the M2I state machine. This quick termination is seen in the MEMSM 600 as the return to the RI or C1 states from the C3 and RN states, so that the cycles finishes as soon as the current individual read operation is completed, thus potentially before the completion of the full cache line read. Similarly the MADRSM 608 returns to the RA1 state if a cycle has not started or when the column addresses have been provided. The MDCDSM 614 returns to the IDLE state if no operation has been started or if the MEMSM 600 is in the C3 or RN states. The M2I state machine returns to the A state whenever the M2IABORT signal is received. On detection of the abort, the ICON block 402 determines the end of the read cycle and resets its pointers to the data in the I2M queue 414 to indicate that no data is present, thus effectively discarding the data which has been read ahead. Thus the read ahead operation terminates as soon as possible after the abort indication is received, saving time by not completing the full cache line retrieval.

Figure 15:
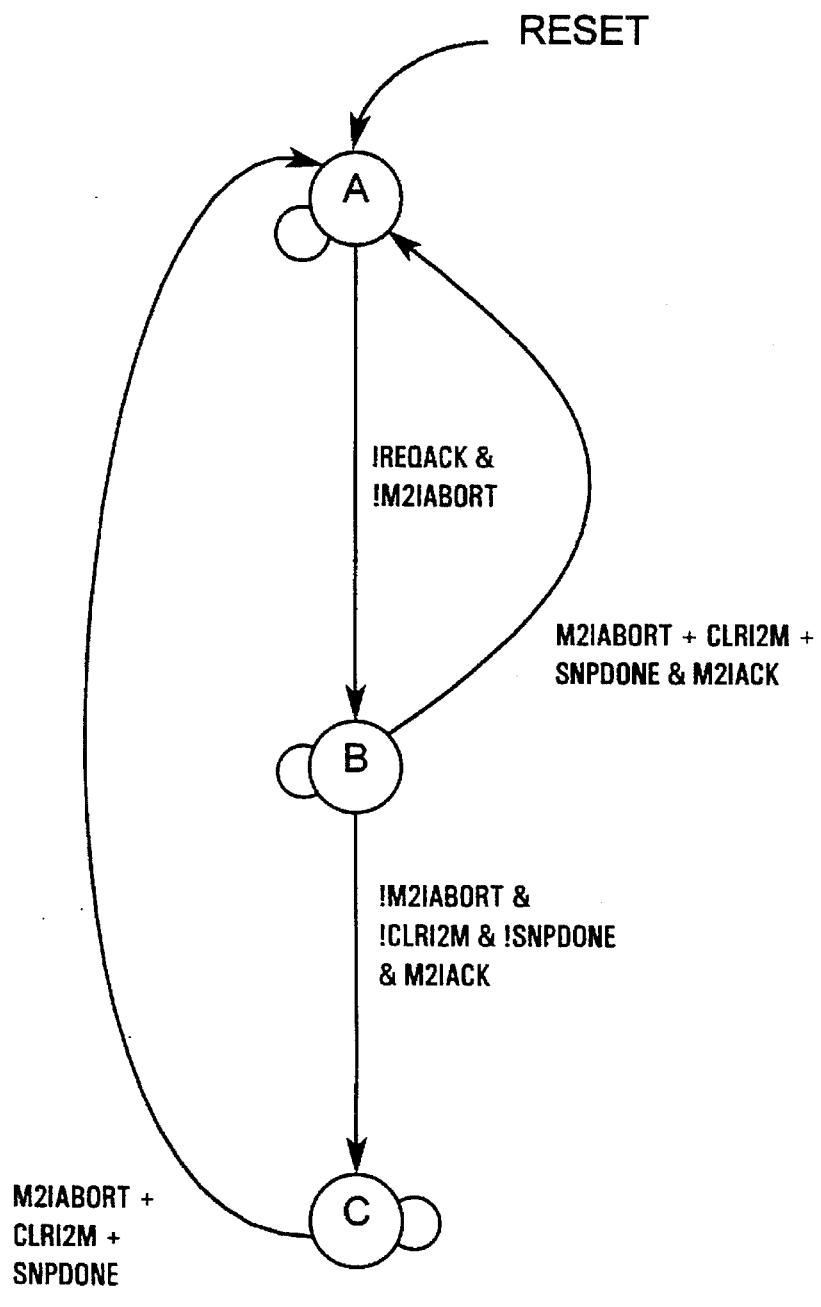
FIG. 15 is a state machine diagram from the memory to PCI next address state machine.

The next address indication to allow the read ahead is provided by the M2INA or memory to the PCI next address state machine shown in FIG. 15. The initial read address will have been provided using the conventional read request mechanism. An M2INA signal is provided to the MCON block 404 to indicate that the next read cycle can being. This state machine begins operation in state A upon reset and proceeds to state B if the PCI read operation is next as indicated by the IREQACK signal and is not being aborted. Otherwise, control remains at state A. Control proceeds from state B back to state A if the cycle is being aborted or if the I2M queue 414 is to be cleared because of a writeback or if the snoop has been completed and the M2IACK signal is provided indicating that the prior read operation has been acknowledged by the MCON block 404. Otherwise control remains at state B. Control proceeds from state B to state C if the cycle is not being aborted, it is not necessary to clear the queue, the snoop operation has not completed and yet an M2IACK signal has been received. Control proceeds from state C back to state A if the cycle is aborted, the I2M queue 414 is being cleared, or the snoop is completed and otherwise remains in state C. Thus the M2INA state machine returns to idle upon receipt of an abort indication.

The M2INA signal is provided to the MCON block 404 to indicate that the next address is being provided, that is, another read request can be issued to keep the I2M queue 414 filled ahead of the PCI bus 98. The M2INA signal is provided if the cycle is not being aborted, the I2M queue 414 is not being cleared, the snoop of the previous read cycle has completed and the M2INA state machine is either in state C or in state B and the M2IACK signal has been received. This M2INA signal is an indication that the processing of the prior address is complete by the MCON block 404 and the processing of the next read address can begin. The actual incrementing of the read address value is performed in the ICON block 402 using an 8 bit counter, thus limiting the total read ahead length to 256 address values. When the counter reaches 255, the read ahead operation is terminated by logic not illustrated for simplicity by causing the Memory Read Multiple to be disconnected. A new address must be received from the PCI bus master to continue the Memory Read Multiple Operation.

Therefore a memory controller according to the preferred embodiment includes many improvements. It is very flexible, allowing simple yet high performance use with a plurality of processor and memory device speeds, allowing flexibility and economics of scale. It provides improved performance by basing idle state RAS* signal level predictions on both processor and PCI bus conditions. It allows very deep write points from several buses and easily handles the various coherency issues. It also provides a quick method for ending read ahead cycles when the basic read operation has been aborted.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system comprising:
    a memory formed of page mode DRAMs;
    a processor performing read and write operations to the memory;
    an input/output bus which can receive bus masters which access the memory, the bus masters performing read and write operations to the memory, the input/output bus including address, data, and control signals, wherein the control signals specify the type of operation independent from an address specified by the address signals;

a hard disk drive for storing information;

a hard disk drive connector coupled to said input/output bus and to said hard disk drive, said hard disk drive connector for coupling and conveying information between said hard disk drive and said input/output bus;

a keyboard connector coupled to said input/output bus, said keyboard connector for receiving keyboard information from a user and providing that keyboard information to said input/output bus; and a memory controller for controlling operation of the DRAMs by providing row and column address strobe signals, including:

means for determining if the memory is in an idle state after completion of a memory operation;

means for storing a last type of operation performed by the memory prior to said idle state;

means for determining if the last type of operation performed was from a bus master on said input/output bus; and means for holding the row address strobe signal asserted during said idle state predictive of a page hit to said page mode DRAMs after said idle state if said last type of operation was from one of the bus masters on said input/output bus and was a predetermined type of operation as specified by the control signals independent from the address specified by the address signals and otherwise setting the row address strobe negated during said idle state predictive of a page miss to said page mode DRAMs after said idle state if said last type of operation was from the one of the bus masters on said input/output bus and was not said predetermined type of operation as specified by the control signals independent from the address specified by the address signals.

2. The computer system of claim 1, wherein said input/output bus includes read operations indicating multiple read operations to occur and wherein said predetermined type includes the multiple read operation.

3. The computer system of claim 2, wherein said memory controller further includes:

means for determining if the last type of operation performed was from said processor; and means for holding the row address strobe asserted if said last type of operation was from said processor and was of a predetermined processor type and otherwise setting the row address strobe negated if said last type of operation was from said processor and was not of said predetermined processor type.

4. The computer system of claim 1, said memory controller further including:

means for posting write operations from said input/output bus; and means for determining if write operations are posted from said input/output bus, and wherein said predetermined type includes said last type of operation being a write from said posting means and write operations are still posted.

5. The computer system of claim 4, wherein said input/output bus includes read operations indicating multiple read operations to occur and wherein said predetermined type includes the multiple read operation.

6. The computer system of claim 5, said memory controller further including:

means for determining if the last type of operation performed was from said processor; and means for holding the row address strobe asserted if said last type of operation was from said processor and was of a predetermined processor type and otherwise setting the row address strobe negated if said last type of operation was from said processor and was not of said predetermined processor type.

7. The computer system of claim 6, further comprising:

a writeback cache system coupled to said processor, and wherein said predetermined processor type includes writeback cycles from said writeback cache.

8. The computer system of claim 6, wherein said predetermined processor type of operation includes a processor code read.

9. The computer system of claim 8, further comprising:

a writeback cache system coupled to said processor and wherein said predetermined processor type includes writeback cycles from said writeback cache.

10. A computer system comprising:

a memory formed of page mode DRAMs;

a processor performing read and write operations to the memory;

an input/output bus which can receive bus masters which access the memory, the bus masters performing read and write operations to the memory, the input/output bus including address, data, and control signals, wherein the control signals specify the type of operation independent from an address specified by the address signals; and a memory controller for controlling operation of the DRAMs by providing row and column address strobe signals, including:

means for determining if the memory is in an idle state after completion of a memory operation;

means for storing a last type of operation performed by the memory prior to said idle state;

means for determining if the last type of operation performed was from a bus master on said input/output bus; and means for holding the row address strobe signal asserted during said idle state predictive of a page hit to said page mode DRAMs after said idle state if said last type of operation was from one of the bus masters on said input/output bus and was a predetermined type of operation as specified by the control signals independent from the address specified by the address signals and otherwise setting the row address strobe negated during said idle state predictive of a page miss to said page mode DRAMs after said idle state if said last type of operation was from the one of the bus masters on said input/output bus and was not said predetermined type of operation as specified by the control signals independent from the address specified by the address signals.

11. The computer system of claim 10, wherein said input/output bus includes read operations indicating multiple read operations to occur and wherein said predetermined type includes the multiple read operation.

12. The computer system of claim 11, wherein said memory controller further includes:

means for determining if the last type of operation performed was from said processor; and means for holding the row address strobe asserted if said last type of operation was from said processor and was of a predetermined processor type and otherwise setting the row address strobe negated if said last type of operation was from said processor and was not of said predetermined processor type.

13. The computer system of claim 11, said memory controller further including:

means for posting write operations from said input/output bus; and means for determining if write operations are posted from said input/output bus, and wherein said predetermined type includes said last type of operation being a write from said posting means and write operations are still posted.

14. The computer system of claim 13, wherein said input/output bus includes read operations indicating multiple read operations to occur and wherein said predetermined type includes the multiple read operation.

15. The computer system of claim 14, said memory controller further including:

means for determining if the last type of operation performed was from said processor; and means for holding the row address strobe asserted if said last type of operation was from said processor and was of a predetermined processor type and otherwise setting the row address strobe negated if said last type of operation was from said processor and was not of said predetermined processor type.

16. The computer system of claim 15, further comprising:

a writeback cache system coupled to said processor, and wherein said predetermined processor type includes writeback cycles from said writeback cache.

17. The computer system of claim 15, wherein said predetermined processor type of operation includes a processor code read.

18. The computer system of claim 17, further comprising:

a writeback cache system coupled to said processor and wherein said predetermined processor type includes writeback cycles from said writeback cache.

19. A method for improving memory accesses in a computer system that includes:

a memory formed of page mode DRAMs;

a processor performing read and write operations to the memory;

an input/output bus which can receive bus masters which access the memory, the bus masters performing read and write operations to the memory, the input/output bus including address, data, and control signals, wherein the control signals specify the type of operation independent from an address specified by the address signals; and a memory controller for controlling operation of the DRAMs by providing row and column address strobe signals;

the method comprising the steps of:

determining if the memory is in an idle state after completion of a memory operation;

storing a last type of operation performed by the memory prior to said idle state;

determining if the last type of operation performed was from a bus master on said input/output bus; and holding the row address strobe signal asserted during said idle state predictive of a page hit to said page mode DRAMs after said idle state if said last type of operation was from one of the bus masters on said input/output bus and was a predetermined type of operation as specified by the control signals independent from the address specified by the address signals and otherwise setting the row address strobe negated during said idle state predictive of a page miss to said page mode DRAMs after said idle state if said last type of operation was from the one of the bus masters on said input/output bus and was not said predetermined type of operation as specified by the control signals independent from the address specified by the address signals.

20. The method of claim 19, wherein said input/output bus includes read operations indicating multiple read operations to occur and wherein said predetermined type includes the multiple read operation.

21. The method of claim 20, further comprising the steps of:

determining if the last type of operation performed was from said processor; and holding the row address strobe asserted if said last type of operation was from said processor and was of a predetermined processor type and otherwise setting the row address strobe negated if said last type of operation was from said processor and was not of said predetermined processor type.

22. The method of claim 19, further comprising the steps of:

posting write operations from said input/output bus; and determining if write operations are posted from said input/output bus, and wherein said predetermined type includes said last type of operation being a write from said posting means and write operations are still posted.

23. The method of claim 22, wherein said input/output bus includes read operations indicating multiple read operations to occur and wherein said predetermined type includes the multiple read operation.

24. The method of claim 23, further comprising the steps of:

determining if the last type of operation performed was from said processor; and holding the row address strobe asserted if said last type of operation was from said processor and was of a predetermined processor type and otherwise setting the row address strobe negated if said last type of operation was from said processor and was not of said predetermined processor type.

25. The method of claim 24, the computer system including a writeback cache system coupled to said processor, wherein said predetermined processor type includes writeback cycles from said writeback cache.

26. The method of claim 24, wherein said predetermined processor type of operation includes a processor code read.

27. The method of claim 26, the computer system including a writeback cache system coupled to said processor, wherein said predetermined processor type includes writeback cycles from said writeback cache.

* * * * *